United States Patent
Yoo et al.

(10) Patent No.: US 10,136,457 B2
(45) Date of Patent: Nov. 20, 2018

(54) METHOD FOR COUPLING SUBSCRIBER IDENTITY MODULE AND ELECTRONIC DEVICE THEREOF

(71) Applicant: Samsung Electronics Co., Ltd., Suwon-si (KR)

(72) Inventors: Jeeyong Yoo, Seoul (KR); Hyung-Woo Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/601,940

(22) Filed: May 22, 2017

(65) Prior Publication Data

US 2017/0359762 A1  Dec. 14, 2017

(30) Foreign Application Priority Data

Jun. 14, 2016  (KR) .................. 10-2016-0073888

(51) Int. Cl.

| | | |
|---|---|---|
| *H04W 76/00* | (2018.01) | |
| *H04W 76/10* | (2018.01) | |
| *H04W 40/24* | (2009.01) | |
| *H04W 76/30* | (2018.01) | |
| *H04W 4/80* | (2018.01) | |
| *H04W 8/20* | (2009.01) | |
| *H04W 88/06* | (2009.01) | |

(52) U.S. Cl.
CPC ............. *H04W 76/10* (2018.02); *H04W 4/80* (2018.02); *H04W 8/205* (2013.01); *H04W 40/248* (2013.01); *H04W 76/30* (2018.02); *H04W 88/06* (2013.01)

(58) Field of Classification Search
CPC ... H04W 76/10; H04W 76/30; H04W 40/248; H04W 88/06; H04W 4/80; H04W 8/205
See application file for complete search history.

(56) References Cited

U.S. PATENT DOCUMENTS

| | | | |
|---|---|---|---|
| 7,213,766 B2 | 5/2007 | Ryan et al. | |
| 8,086,269 B2 | 12/2011 | Wang | |
| 8,581,706 B2 | 11/2013 | Finkenzeller et al. | |
| 9,092,772 B2 | 7/2015 | Fernandez et al. | |
| 2009/0275364 A1* | 11/2009 | Morel ................ | G06K 7/10297 455/558 |
| 2012/0052801 A1* | 3/2012 | Kulkarni .............. | G06K 7/0008 455/41.1 |
| 2013/0169059 A1 | 7/2013 | Sun et al. | |

(Continued)

FOREIGN PATENT DOCUMENTS

KR  20150136792 A  12/2015

*Primary Examiner* — Khai M Nguyen

(57) ABSTRACT

A method for coupling a subscriber identity module in an electronic device and the electronic device thereof. The method includes sensing a request for changing from a currently coupled 1st SIM to a 2nd SIM among a plurality of SIMs. A 1st communication protocol between the 1st SIM and a short-range communication module is inactivated in response to the change request to release a 1st communication session with the 1st SIM. A 2nd communication protocol between the 2nd SIM and the short-range communication module is activated to couple a 2nd communication session with the 2nd SIM.

22 Claims, 14 Drawing Sheets

(56) References Cited

U.S. PATENT DOCUMENTS

| | | | | |
|---|---|---|---|---|
| 2013/0225239 A1* | 8/2013 | Wu | ............... | H04M 1/72519 |
| | | | | 455/558 |
| 2014/0057558 A1* | 2/2014 | Cooper | ............... | H04W 12/06 |
| | | | | 455/41.1 |
| 2014/0335798 A1* | 11/2014 | Ballesteros | ............... | H04B 1/40 |
| | | | | 455/73 |
| 2015/0349852 A1* | 12/2015 | Choi | ............... | H04M 1/72519 |
| | | | | 455/41.1 |
| 2016/0014578 A1* | 1/2016 | Kadiyala | ............... | H04W 4/16 |
| | | | | 455/414.1 |
| 2016/0014579 A1* | 1/2016 | Kasilya Sudarsan et al. ............... |
| | | | | H04W 4/16 |
| | | | | 455/417 |
| 2016/0088467 A1* | 3/2016 | Reddem | ............... | H04W 8/20 |
| | | | | 455/418 |
| 2017/0070346 A1* | 3/2017 | Lombardi | ............... | H04L 63/0428 |
| 2017/0105241 A1* | 4/2017 | Nien | ............... | H04B 1/3816 |

* cited by examiner

METHOD FOR COUPLING SUBSCRIBER IDENTITY MODULE AND ELECTRONIC DEVICE THEREOF

CROSS-REFERENCE TO RELATED APPLICATION(S) AND CLAIM OF PRIORITY

The present application is related to and claims the priority under 35 U.S.C. § 119(a) to Korean Application Serial No. 10-2016-0073888, which was filed in the Korean Intellectual Property Office on Jun. 14, 2016, the entire content of which is hereby incorporated by reference.

BACKGROUND

The present disclosure relates to a method for coupling a subscriber identity module in an electronic device, and the electronic device thereof.

With the growth of functions of electronic devices, technologies using a Subscriber Identity Module (SIM) that can store user's various pieces of information are now in the spotlight. Because the electronic device has the SIM capable of storing various pieces of information, the electronic device can perform short range communication with another electronic device or a reader. For example, if a user tags the electronic device to the reader, the electronic device may perform a transportation fare payment service, a card payment service, etc., using the SIM in which payment information and user's personal information are stored.

SUMMARY

Even if an electronic device includes a plurality of SIMs, the electronic device uses just one fixed SIM to perform a Near Field Communication (NFC) function, because only one of the plurality of SIMs is electrically coupled with an NFC module of the electronic device for the purpose of the NFC function.

To address the above-discussed deficiencies, it is a primary object to provide an apparatus and method of selectively coupling an NFC module and one of a plurality of SIMs and performing an NFC function so as to enhance a user's convenience in an electronic device.

In accordance with various exemplary embodiments, the present disclosure may provide an apparatus and method of efficiently coupling and releasing between a plurality of SIMs and an NFC module for the sake of efficient communication between the plurality of SIMs and the NFC module in an electronic device.

According to various exemplary embodiments, an electronic device may include a plurality of Subscriber Identity Modules (SIMs), a short-range communication module electrically coupled with the plurality of SIMs, and at least one processor. If a SIM change request is sensed, the processor may transmit a request for coupling release of a coupled 1st SIM among the plurality of SIMs to the short-range communication module, and if the coupling release is completed, transmit a request for coupling of a chosen 2nd SIM among the plurality of SIMs to the short-range communication module. The short-range communication module may inactivate a 1st communication protocol between the 1st SIM and the short-range communication module in response to the coupling release request, thereby coupling releasing a 1st communication session between the 1st SIM and the short-range communication module, and activate a 2nd communication protocol between the 2nd SIM and the short-range communication module in response to the coupling request, thereby coupling a 2nd communication session between the 2nd SIM and the short-range communication module.

According to various exemplary embodiments, a method for operating in an electronic device may include the operations of sensing a request for change from a currently coupled 1st Subscriber Identify Module (SIM) to a 2nd SIM among a plurality of SIMs, inactivating a 1st communication protocol between the 1st SIM and a short-range communication module in response to the change request, to release a 1st communication session with the 1st SIM, and activating a 2nd communication protocol between the 2nd SIM and the short-range communication module, to couple a 2nd communication session with the 2nd SIM.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may *mean* to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
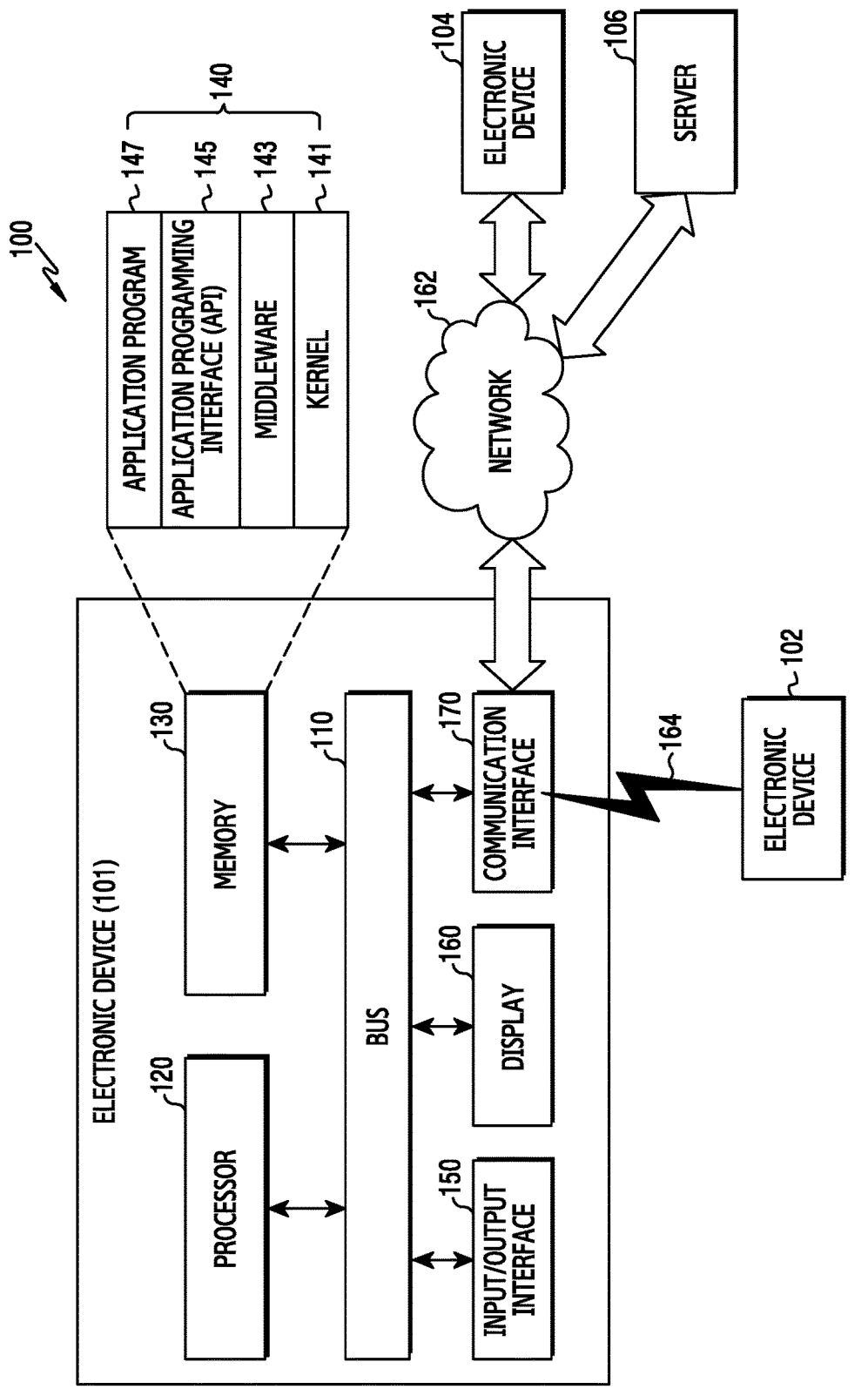
FIG. 1 illustrates a construction of an electronic device within a network environment according to various exemplary embodiments.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, exemplary embodiments of the present disclosure will be described in detail with reference to the accompanying drawings. Detailed descriptions of well-known functions and structures incorporated herein may be omitted to avoid obscuring the subject matter of the present disclosure. Further, the terms used herein are defined in consideration of functions of the present disclosure and may vary depending on a user's or an operator's intension and usage. Therefore, the terms used herein should be understood based on the descriptions made herein. In the present disclosure, an expression such as "A or B," "at least one of A or/and B," or "one or more of A or/and B" may include all possible combinations of together listed items. Expressions such as "first," "second," "primarily," or "secondary," used in various exemplary embodiments may represent various elements regardless of order and/or importance and do not limit corresponding elements. The expressions may be used for distinguishing one element from another element. When it is described that an element (such as a first element) is "(operatively or communicatively) coupled" to or "connected" to another element (such as a second element), the element can be directly connected to the other element or can be connected through the other element such as a third element).

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a generic-purpose processor (such as a Central Processing Unit (CPU) or an application processor) that can perform a corresponding operation by executing at least one software program stored at an exclusive processor (such as an embedded processor) for performing a corresponding operation or at a memory device.

An electronic device according to various exemplary embodiments of the present disclosure can include, for example, at least one of a smart phone, a tablet Personal Computer (PC), a mobile phone, a video phone, an e-book reader, a desktop PC, a laptop PC, a netbook computer, a workstation, a sever, a Personal Digital Assistant (PDA), a Portable Multimedia Player (PMP), an MPEG 3 (MP3) player, a mobile medical equipment, a camera, and a wearable device. The wearable device can include at least one of an accessory type (e.g., a watch, a ring, a bracelet, an ankle bracelet, a necklace, glasses, a contact lens, or a Head-Mounted-Device (HMD)), a fabric or clothing embedded type (e.g., electronic garments), a body attachable type (e.g., a skin pad or a tattoo), and an implantable circuit. The electronic device can include at least one of, for example, a television, a Digital Video Disk (DVD) player, an audio device, a refrigerator, an air-conditioner, a cleaner, an oven, a microwave oven, a washing machine, an air cleaner, a set-top box, a home automation control panel, a security control panel, a media box (such as SAMSUNG HOME-SYNC™, APPLE TV®, or GOOGLE TV®), a game console (such as XBOX®, PLAYSTATION®), an electronic dictionary, an electronic key, a camcorder, and an electronic frame.

In another embodiment, the electronic device can include at least one of various medical devices (such as various portable medical measuring devices (a blood sugar measuring device, a heartbeat measuring device, a blood pressure measuring device, or a body temperature measuring device), a Magnetic Resonance Angiography (MRA) device, a Magnetic Resonance Imaging (MRI) device, a Computed Tomography (CT) device, a scanning machine, and an ultrasonic wave device), a navigation device, a Global Navigation Satellite System (GNSS), an Event Data Recorder (EDR), a Flight Data recorder (FDR), a vehicle infotainment device, an electronic equipment for ship (such as a navigation device for ship and gyro compass), avionics, a security device, a head unit for a vehicle, an industrial or home robot, a drone, an Automatic Teller's Machine (ATM) of a financial institution, a point of sales (POS) of a store, and Internet of things (such as a bulb, various sensors, a sprinkler device, a fire alarm, a thermostat, a street light, a toaster, a sports equipment, a hot water tank, a heater, and a boiler). According to an embodiment, the electronic device can include at least one of a portion of furniture, building/construction or vehicle, an electronic board, an electronic signature receiving device, a projector, and various measuring devices (such as water supply, electricity, gas, or electric wave measuring device). An electronic device according to an embodiment is a flexible electronic device or a combination of two or more of the foregoing various devices. An electronic device according to an embodiment of the present disclosure is not limited to the foregoing devices and includes a new electronic device according to technical development. In this specification, the term "user" can refer to a person using an electronic device or a device using an electronic device (e.g., an artificial intelligent electronic device).

Referring to FIG. 1, an electronic device 101 resides in a network 100. The electronic device 101 can include a bus 110, a processor 120, a memory 130, an input/output (I/O) interface 150, a display 160, and a communication interface 170. The electronic device 101 can omit at least one of the components or further include another component. The bus 110 can include a circuit for connecting the components 110 to 170 and delivering communication signals (e.g., control messages or data) therebetween. The processor 120 can include one or more of a central processing unit, an application processor, and a Communication Processor (CP). The processor 120, for example, can perform an operation or data processing on control and/or communication of at least another component of the electronic device 101.

The memory 130 can include a volatile and/or nonvolatile memory. The memory 130, for example, can store commands or data relating to at least another component of the electronic device 101. According to an embodiment, the memory 130 can store software and/or a program 140. The program 140, for example, can include a kernel 141, middleware 143, an Application Programming Interface (API) 145, and/or an application program (or "application") 147. At least part of the kernel 141, the middleware 143, or the API 145 can be called an Operating System (OS). The kernel 141 can control or manage system resources (e.g., the bus 110, the processor 120, or the memory 130) used for performing operations or functions implemented by the other programs (e.g., the middleware 134, the API 145, or the application program 147). Additionally, the kernel 141 can provide an interface for controlling or managing system resources by accessing an individual component of the electronic device 101 from the middleware 143, the API 145, or the application program 147.

The middleware 143, for example, can serve as an intermediary role for exchanging data between the API 145 or the application program 147 and the kernel 141 through communication. Additionally, the middleware 132 can process one or more job requests received from the application program 147, based on their priority. For example, the middleware 143 can assign a priority for using a system resource (e.g., the bus 110, the processor 120, or the memory 130) of the electronic device 101 to at least one of the application programs 147, and process the one or more job requests. The API 145, as an interface through which the application 147 controls a function provided from the kernel 141 or the middleware 143, can include, for example, at least one interface or function (e.g., an instruction) for file control, window control, image processing, or character control.

The I/O interface 150 may recognize a user's input. The I/O interface 150 may be a touch input unit. In addition, the I/O interface 150 may be an input/output interface including an output unit. The input/output interface may serve as an interface for delivering a command or data which is inputted from the user or another external device to the other element(s) of the electronic device 101. In addition, the input/output interface may output a command or data which is received from the other element(s) of the electronic device 101 to the user or another external device.

The display 160, for example, can include a Liquid Crystal Display (LCD), a Light Emitting Diode (LED) display, an Organic Light Emitting Diode (OLED) display, a MicroElectroMechanical Systems (MEMS) display, or an electronic paper display. The display 160, for example, can display various contents (e.g., texts, images, videos, icons, and/or symbols) to the user. The display 160 can include a touch screen, for example, and receive touch, gesture, proximity, or hovering inputs by using an electronic pen or a user's body part.

The communication interface 170, for example, can set a communication between the electronic device 101 and an external device (e.g., a first external electronic device 102, a second external electronic device 104, or a server 106). For example, the communication interface 170 can communicate with the external device (e.g., the second external electronic device 104 or the server 106) over the network 162 through wireless communication or wired communication.

The wireless communication, for example, can at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. The wireless communication may include, for example, short-range communication 164. The short-range communication 164 may be conducted by, for example, at least one of BLUETOOTH®, Bluetooth Low Energy (BLE), ZIGBEE®, Near Field Communication (NFC), magnetic secure transmission, Radio Frequency (RF), and Body Area Network (BAN). The wireless communication can include GNSS. The GNSS can include, for example, Global Positioning System (GPS), Global Navigation Satellite System (GLONASS), BeiDou navigation satellite system (BEIDOU), or GALILEO (the European global satellite-based navigation system). Hereafter, the GPS can be interchangeably used with the GNSS. The wired communication, for example, can include at least one of Universal Serial Bus (USB), High Definition Multimedia Interface (HDMI), Recommended Standard 232 (RS-232), power line communications, and Plain Old Telephone Service (POTS). The network 162 can include at least one of telecommunications networks such as computer network (e.g., LAN or WAN), Internet, and telephone network.

Each of the first and second external electronic devices 102 and 104 can be the same or different type of the electronic device 101. According to various embodiments, all or part of operations executed in the electronic device 101 can be executed by another or a plurality of electronic devices (e.g., the electronic device 102 or 104 or the server 106). When the electronic device 101 is to perform a function or service automatically or at the request, instead of performing the function or the service by the electronic device 101 or additionally, the electronic device 101 can request at least part of a function relating thereto from another device (e.g., the electronic device 102 or 104, or the server 106). The other electronic device (e.g., the electronic device 102 or 104, or the server 106) can perform the requested function or an additional function and deliver its result to the electronic device 101. The electronic device 101 can provide the requested function or service by processing the received result as it is or additionally. For doing so, for example, cloud computing, distributed computing, or client-server computing techniques can be used.

Figure 2:
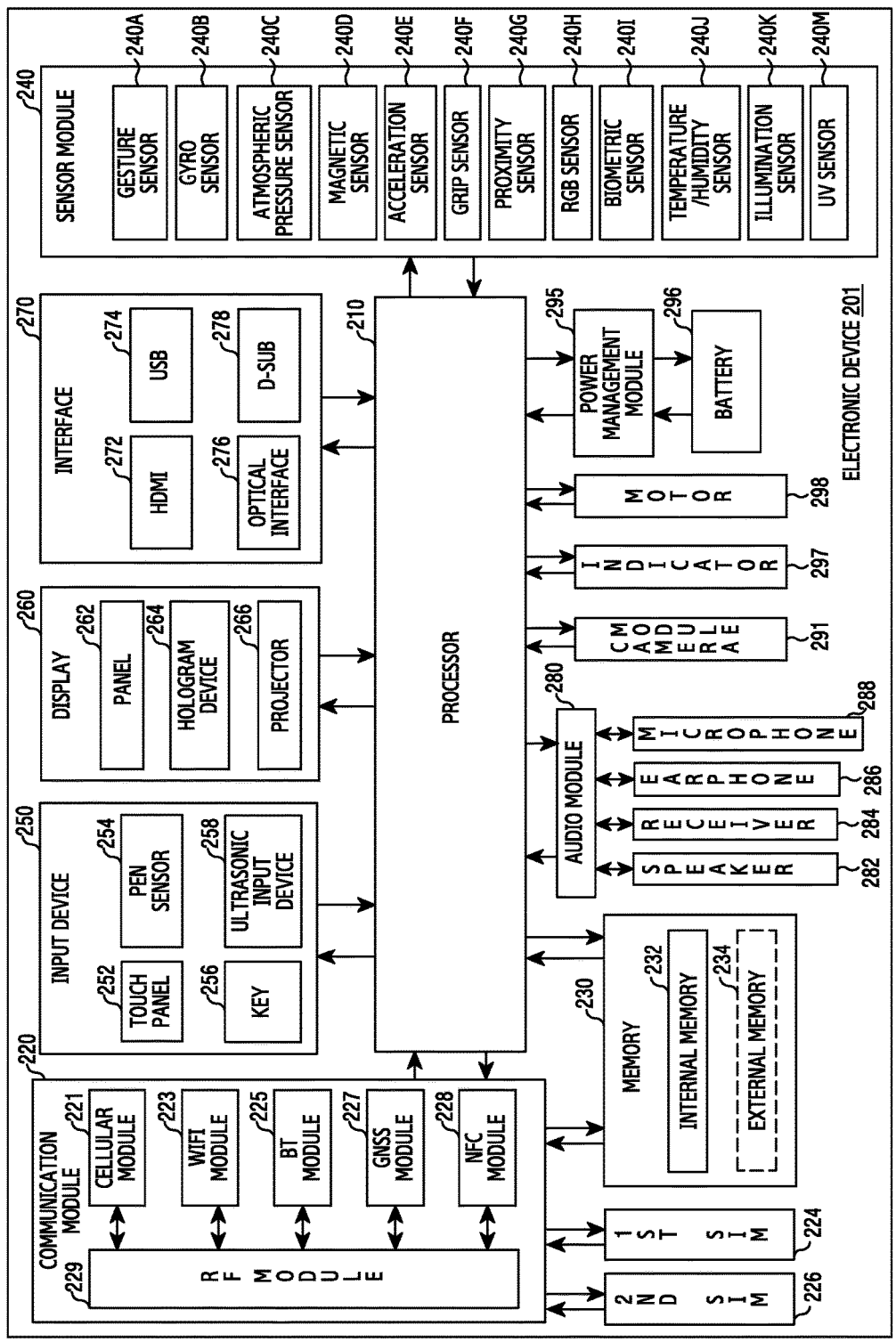
FIG. 2 illustrates a construction of an electronic device according to various exemplary embodiments.

FIG. 2 illustrates a construction of an electronic device 201 according to various exemplary embodiments. The electronic device 201 may, for example, include the entire or part of the electronic device 101 illustrated in FIG. 1. The electronic device 201 may include one or more processors (e.g., an Application Processor (AP)) 210, a communication module 220, 1st and 2nd subscriber identity modules 224 and 226, a memory 230, a sensor module 240, an input device 250, a display 260, an interface 270, an audio module 280, a camera module 291, a power management module 295, a battery 296, an indicator 297, and a motor 298.

The processor 210, for example, can control a plurality of hardware or software components connected to the processor 210 and also perform various data processing and operations by executing an operating system or an application program. The processor 210 can be implemented with a System on Chip (SoC), for example. The processor 210 can further include a Graphic Processing Unit (GPU) and/or an image signal processor. The processor 210 may include at least some (e.g., cellular module 221) of the constituent elements illustrated in FIG. 2 as well. The processor 210 may load, to a volatile memory, a command or data received from at least one of the other constituent elements (e.g., non-volatile memory) and process the loaded command or data, and store the result data in the non-volatile memory The communication module 220 can have the same or similar configuration to the communication interface 170. The communication module 220 can include, for example, a cellular module 221, a WIFI® module 223, a BLUETOOTH® (BT) module 225, a GNSS module 227, an NFC module 228, and an RF module 229. The cellular module 221, for example, can provide voice call, video call, Short Message Service (SMS), or internet service through a communication network. According to one exemplary embodiment, the cellular module 221 may use any one of the 1st and 2nd subscriber identity modules (e.g., SIM cards) 224 and 226, to perform the distinction and authentication of the electronic device 201 within a communication network. The cellular module 221 can perform at least part of a function that the processor 210 provides. The cellular module 221 can further include a CP. At least part (e.g., two or more) of the WIFI® module 223, the BT module 225, the GNSS module 227, and the NFC module 228 can be included in one integrated chip (IC) or an IC package. The RF module 229, for example, can transmit/receive a communication signal (e.g., an RF signal). The RF module 229, for example, can include a transceiver, a Power Amp Module (PAM), a frequency filter, a Low Noise Amplifier (LNA), or an antenna. According to another embodiment, at least one of the cellular module 221, the WIFI® module 223, the BT module 225, the GNSS module 227, and the NFC module 228 can transmit/receive an RF signal through an additional RF module. According to one exemplary embodiment, the subscriber identity modules 224 and 226 each may, for example, include a card including a subscriber identity module or an embedded SIM, and may include unique identity information (e.g., Integrated Circuit Card Identifier (ICCID)) or subscriber information (e.g., International Mobile Subscriber Identity (IMSI)).

The memory 230 (e.g., the memory 130) can include an internal memory 232 or an external memory 234. The internal memory 232 can include at least one of, for example, a volatile memory (e.g., Dynamic RAM (DRAM), Static RAM (SRAM), or Synchronous Dynamic RAM (SDRAM)), and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory, hard drive, and solid state drive (SSD)). The external memory 234 can include flash drive, for example, Compact Flash (CF), Secure Digital (SD), micro SD, mini SD, extreme digital (xD), Multi-Media Card (MMC), or memory stick. The external memory 234 can be functionally or physically connected to the electronic device 201 through various interfaces.

The sensor module 240 can, for example, measure physical quantities or detect an operating state of the electronic device 201, and thus convert the measured or detected information into electrical signals. The sensor module 240 can include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red, green, blue (RGB) sensor), a biometric sensor 240I, a temperature/humidity sensor 240J, an illumination sensor 240K, and an Ultra Violet (UV) sensor 240M. Additionally/alternately, the sensor module 240 can include an E-nose sensor, an electromyography (EMG) sensor, an electroencephalogram (EEG) sensor, an electrocardiogram (ECG) sensor, an infra-red (IR) sensor, an iris sensor, and/or a fingerprint sensor. The sensor module 240 can further include a control circuit for controlling at least one sensor therein. The electronic device, as part of the processor 210 or individually, can further include a processor configured to control the sensor module 240 and thus control the sensor module 240 while the processor 210 is sleeping.

The input device 250 can include, for example, a touch panel 252, a (digital) pen sensor 254, a key 256, or an ultrasonic input device 258. The touch panel 252 can use at least one of, for example, capacitive, resistive, infrared, and ultrasonic methods. Additionally, the touch panel 252 can further include a control circuit. The touch panel 252 can further include a tactile layer to provide a tactile response to a user. The (digital) pen sensor 254 can include, for example, part of a touch panel or a sheet for recognition. The key 256 can include, for example, a physical button, a touch key, an optical key, or a keypad. The ultrasonic input device 258 can detect ultrasonic waves from an input means through a microphone (e.g., a microphone 288) and check data corresponding to the detected ultrasonic waves.

The display 260 (e.g., the display 160) can include a panel 262, a hologram device 264, a projector 266, and/or a control circuit for controlling them. The panel 262 can be implemented to be flexible, transparent, or wearable, for example. The panel 262 and the touch panel 252 can be configured with one or more modules. The hologram device 264 can show three-dimensional images in the air by using the interference of light. The projector 266 can display an image by projecting light on a screen. The screen, for example, can be placed inside or outside the electronic device 201. The interface 270 can include a High-Definition Multimedia Interface (HDMI) 272, a Universal Serial Bus (USB) 274, an optical interface 276, or a D-subminiature (sub) 278, for example. The interface 270 can be included in the communication interface 170 of FIG. 1, for example. Additionally or alternatively, the interface 270 can include a Mobile High-Definition Link (MHL) interface, a SD card/MMC interface, or an Infrared Data Association (IrDA) standard interface.

The audio module 280, for example, can convert sound into electrical signals and convert electrical signals into sounds. At least some components of the audio module 280 can be included in the I/O interface 150 of FIG. 1, for example. The audio module 280 can process sound information inputted or outputted through a speaker 282, a receiver 284, an earphone 286, or the microphone 288. The camera module 291, as a device for capturing a still image and a video, can include one or more image sensors (e.g., a front sensor or a rear sensor), a lens, an Image Signal Processor (ISP), or a flash (e.g., an LED or a xenon lamp). The power management module 295, for example, can manage the power of the electronic device 201. According to an embodiment, the power management module 295 can include a Power Management IC (PMIC), a charger IC, or a battery or fuel gauge, for example. The PMIC can have a wired and/or wireless charging method. The wireless charging method can include, for example, a magnetic resonance method, a magnetic induction method, or an electromagnetic method, and can further include an additional circuit for wireless charging, for example, a coil loop, a resonant circuit, or a rectifier circuit. The battery gauge can measure the remaining amount of the battery 296, or a voltage, current, or temperature of the battery 296 during charging. The battery 296 can include, for example, a rechargeable battery and/or a solar battery.

The indicator 297 can display a specific state of the electronic device 201 or part thereof (e.g., the processor 210), for example, a booting state, a message state, or a charging state. The motor 298 can convert electrical signals into mechanical vibration and generate a vibration or haptic effect. The electronic device 201 can include a mobile TV supporting device (e.g., a GPU) for processing media data according to standards such as Digital Multimedia Broadcasting (DMB), Digital Video Broadcasting (DVB), or MEDIAFLO™. Each of the above-mentioned components of the electronic device can be configured with at least one component and the name of a corresponding component can vary according to the kind of an electronic device. In various embodiments, an electronic device (e.g., the electronic device 201) can be configured including at least one of the above-mentioned components or another component, or not including some of the above-mentioned components. Additionally, some of components in an electronic device according to various embodiments of the present disclosure are configured as one entity, so that functions of previous corresponding components are performed identically.

Figure 3:
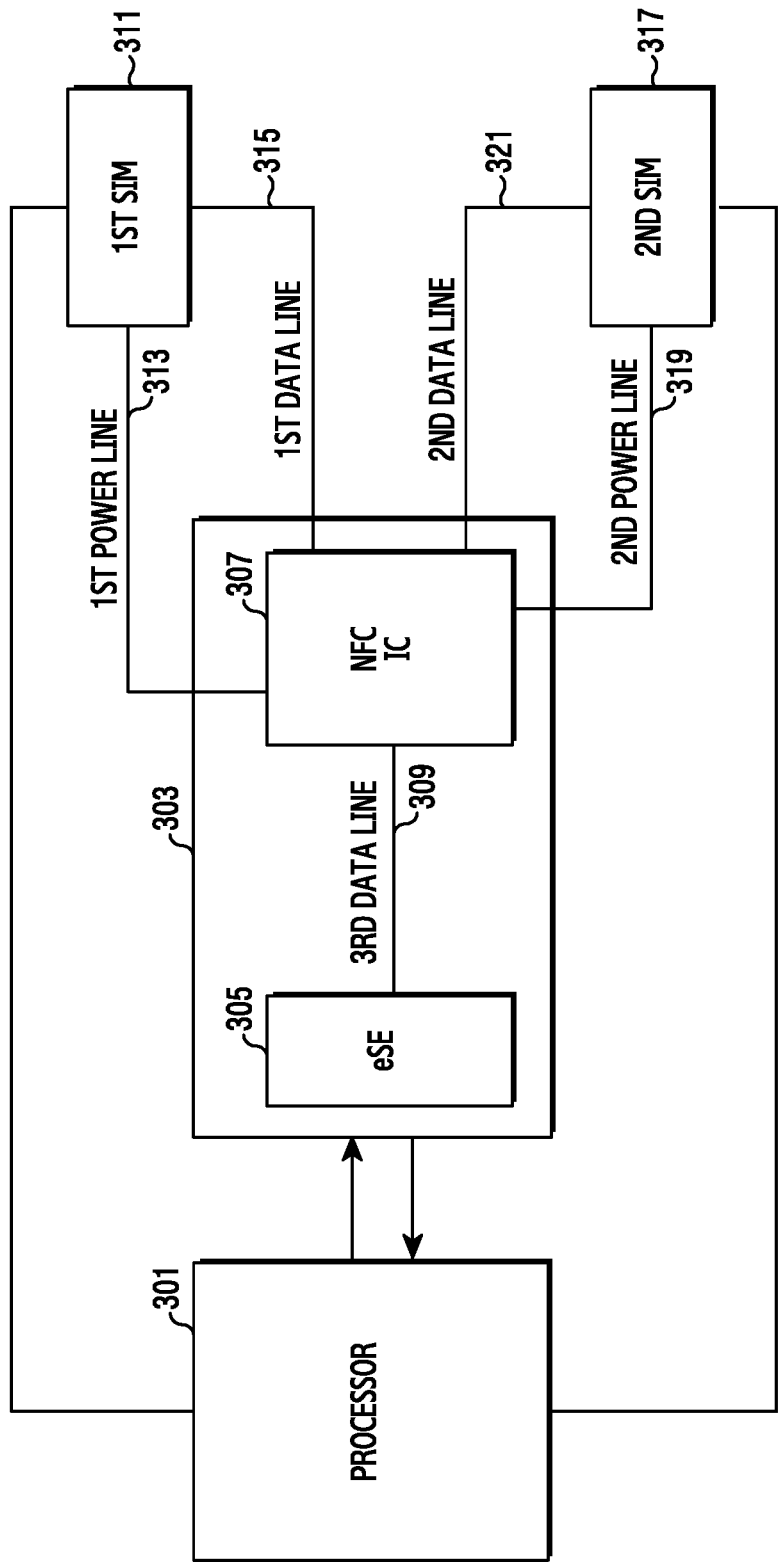
FIG. 3 illustrates a construction of a part of an electronic device according to various exemplary embodiments.

FIG. 3 illustrates a construction of a part of an electronic device according to various exemplary embodiments. For example, the electronic device may be the electronic device 101 illustrated in FIG. 1 or the electronic device 201 illustrated in FIG. 2.

According to one exemplary embodiment, the electronic device (e.g., the electronic device 201) may include a processor 301, an NFC module 303, a 1st Subscriber Identity Module (1st SIM) 311, and a 2nd Subscriber Identity Module (2nd SIM) 317.

According to one exemplary embodiment, the NFC module 303 (e.g., the NFC module 228) may include an embedded Secure Element (eSE) 305 and an NFC Integrated Circuit (NFC IC) 307. According to one exemplary embodiment, the eSE 305 may safely secure user's sensitive data, and support secure contactless payment that is based on an NFC technology. According to one exemplary embodiment, the eSE 305 may safely store authentication information for payment. According to one exemplary embodiment, the authentication information may include an encryption key for convenient fingerprint authentication and other applications, a user's payment certificate and user's biometric information (e.g., the fingerprint, the iris, a voice, etc.).

According to one exemplary embodiment, the NFC IC 307 may support an NFC function such as a contactless payment function and the like. According to one exemplary embodiment, the NFC function may mean various functions employing an NFC technology of transmitting/receiving data between electronic devices at a close distance of 10 centimeters (cm) through a specific frequency band (e.g., 13.56 Mega Hertz (MHz)). According to one exemplary embodiment, the NFC function may include not only a payment function but also a transportation card function, a smart door lock function or the like.

According to one exemplary embodiment, the NFC IC 307 may be physically or electrically coupled with the 1st and 2nd SIMs 311 and 317, concurrently or together. According to one exemplary embodiment, the NFC IC 307 may be logically coupled with one of the 1st and 2nd SIMs 311 and 317.

According to one exemplary embodiment, the eSE 305 and the NFC IC 307 may be electrically or physically coupled with each other by a 3rd data line 309. According to one exemplary embodiment, the NFC IC 307 may transmit data to the eSE 305 or receive data from the eSE 305 through the 3rd data line 309, using a specific communication protocol. For example, the specific communication protocol may be a Single Wire Protocol (SWP). According to one exemplary embodiment, the SWP may be the standard for single wire coupling between the 1st and 2nd SIMs 311 and 317 and the NFC IC 307 in the electronic device 201 (e.g., cell phone). For example, a 3rd SWP may represent a SWP between the eSE 305 and the NFC IC 307.

According to one exemplary embodiment, the 1st and 2nd SIMs 311 and 317 (e.g., the 1st and 2nd subscriber identity modules 224 and 226) each may be a module storing communication related information (e.g., communication service provider information, a phone number, unique identifier information, etc.) for communication with a communication network (e.g., cellular communication network), and/or user's personal information (e.g., a user password, user medical information and the like) aiming at user's authentication. According to one exemplary embodiment, the 1st and 2nd SIMs 311 and 317 each may further include billing information.

According to one exemplary embodiment, the billing information may be fare information in which a user subscribes to a communication network that is connectable using each of the 1st and 2nd SIMs 311 and 317. According to one exemplary embodiment, in case where the electronic device 201 is a prepaid phone, the billing information may be remaining amount information of a prepaid card. According to one exemplary embodiment, the 1st and 2nd SIMs 311 and 317 each may further include NFC information representing NFC function support or non-support.

According to one exemplary embodiment, the 1st and 2nd SIMs 311 and 317 each may be coupled to the processor 301 and the NFC module 303. According to one exemplary embodiment, the 1st and 2nd SIMs 311 and 317 each may be electrically or physically coupled to the NFC IC 307. According to one exemplary embodiment, a 1st power line 313 and a 1st data line 315 may be located between the 1st SIM 311 and the NFC IC 307. For example, the NFC IC 307 may apply a power source (e.g., 1.8 voltages (V) or 3.0V) to the 1st SIM 311 through the 1st power line 313. For example, the NFC IC 307 may use a specific communication protocol, to transmit data to the 1st SIM 311 or receive data from the 1st SIM 311 through the 1st data line 315. For example, the specific communication protocol may be a SWP. For example, a 1st SWP may represent a SWP between the NFC IC 307 and the 1st SIM 311.

According to one exemplary embodiment, a 2nd power line 319 and a 2nd data line 321 may be located between the 2nd SIM 317 and the NFC IC 307. For example, the NFC IC 307 may apply a power source (e.g., 1.8V or 3.0V) to the 2nd SIM 317 through the 2nd power line 319. For example, the NFC IC 307 may use a specific communication protocol, to transmit data to the 2nd SIM 317 or receive data from the 2nd SIM 317 through the 2nd data line 321. For example, the specific communication protocol may be a SWP. For example, a 2nd SWP may represent a SWP between the NFC IC 307 and the 2nd SIM 317.

According to one exemplary embodiment, a memory (e.g., the memory 130 or the memory 230) of the electronic device 201 may store a routing table. According to one exemplary embodiment, the routing table may be a look-up table that includes information (e.g., at least one, etc. of communication service provider information, unique identifier information, a phone number, NFC information representing NFC support availability or non-availability and billing information) about a plurality of SIMs and coupling information representing logical coupling or non-coupling between the NFC IC 403 and a corresponding SIM.

According to one exemplary embodiment, the routing table may include a form such as Table 1.

TABLE 1

| SIM name | Phone number | NFC support | Coupling or non-coupling |
|---|---|---|---|
| 1st SIM | 012-345-6789 | Unavailable | Non-coupling |
| 2nd SIM | 123-456-7890 | Available | Coupling |

According to one exemplary embodiment, the routing table may include a SIM name, a phone number, NFC information, and coupling information. According to one exemplary embodiment, the routing table may not be limited to the form such as Table 1. For example, the routing table may have a form such as Table 2.

TABLE 2

| SIM name | Phone number | Coupling or non-coupling |
| --- | --- | --- |
| 1st SIM | 012-345-6789 | Non-coupling |
| 2nd SIM | 123-456-7890 | Coupling |

According to one exemplary embodiment, the routing table may include a SIM name, a phone number, and coupling information.

According to one exemplary embodiment, if a SIM change request for changing the existing SIM coupled with the NFC module 303 among a plurality of SIMs 311 and 317 into a chosen SIM is received, the processor 301 may inactivate a SWP between the NFC IC 307 and the existing SIM through the NFC module 303, thereby coupling-releasing a communication session between the NFC IC 307 and the existing SIM. According to one exemplary embodiment, the processor 301 may inactivate the SWP between the NFC IC 307 and the existing SIM through the NFC module 303, thereby keeping physical or electrical coupling between the NFC IC 307 and the existing SIM while releasing logical coupling between the NFC IC 307 and the existing SIM.

According to one exemplary embodiment, the NFC module 303 may include or not include a switch that switches physical coupling between the NFC IC 307 and the plurality of SIMs 311 and 317. According to one exemplary embodiment, in accordance with the control of the processor 301, the NFC module 303 may release or establish physical coupling between the NFC IC 307 and the plurality of SIMs 311 and 317 based on switch On or Off or, instead of releasing or establishing the physical coupling between the NFC IC 307 and the plurality of SIMs 311 and 317 based on the switch On or Off, the NFC module 303 may activate or inactivate a communication protocol between the NFC IC 307 and the plurality of SIMs 311 and 317, thereby releasing or establishing logical coupling between the NFC IC 307 and the plurality of SIMs 311 and 317.

According to one exemplary embodiment, the processor 301 may activate a SWP between the NFC IC 307 and a chosen SIM through the NFC module 303, thereby coupling a communication session between the NFC IC 307 and the chosen SIM. According to one exemplary embodiment, the processor 301 may activate the SWP between the NFC IC 307 and the chosen SIM through the NFC module 303, thereby establishing logical coupling as well as physical or electrical coupling between the NFC IC 307 and the chosen SIM.

According to one exemplary embodiment, the processor 301 may update the routing table based on information about a chosen SIM. According to one exemplary embodiment, the processor 301 may update coupling information (e.g., from non-coupling to coupling) about the chosen SIM and coupling information (e.g., from coupling to non-coupling) about the existing SIM, which are included in the routing table.

According to one exemplary embodiment, if a new SIM is inserted into the electronic device 201, the processor 301 may request the NFC module 303 to apply a power source to the inserted SIM and if the power source is applied to the inserted SIM, the processor 301 may activate a SWP between the NFC IC 307 and the inserted SIM through the NFC module 303, thereby coupling a communication session between the NFC IC 307 and the inserted SIM. According to one exemplary embodiment, the processor 301 may activate the SWP between the NFC IC 307 and the inserted SIM through the NFC module 303, thereby establishing logical coupling as well as physical or electrical coupling between the NFC IC 307 and the inserted SIM.

According to one exemplary embodiment, the processor 301 may update the routing table based on information about an inserted SIM. According to one exemplary embodiment, the processor 301 may update the routing table such that the information (e.g., at least one of a name, a phone number, NFC information and coupling information) on the inserted SIM is included in the routing table.

According to one exemplary embodiment, an electronic device may include a plurality of Subscriber Identity Modules (SIMs), a short-range communication module electrically coupled with the plurality of SIMs, and at least one processor.

According to one exemplary embodiment, if a SIM change request is sensed, the processor may transmit a request for coupling release of a coupled 1st SIM among the plurality of SIMs to the short-range communication module and if the coupling release is completed, the processor may transmit a request for coupling of a chosen 2nd SIM among the plurality of SIMs to the short-range communication module.

According to one exemplary embodiment, the short-range communication module may inactivate a 1st communication protocol between the 1st SIM and the short-range communication module in response to the coupling release request, thereby coupling releasing a 1st communication session between the 1st SIM and the short-range communication module, and activate a 2nd communication protocol between the 2nd SIM and the short-range communication module in response to the coupling request, thereby coupling a 2nd communication session between the 2nd SIM and the short-range communication module.

According to one exemplary embodiment, the short-range communication module may release logical coupling between the 1st SIM and the short-range communication module, in response to the coupling release request.

According to one exemplary embodiment, the short-range communication module may establish logical coupling between the 2nd SIM and the short-range communication module, in response to the coupling request.

According to one exemplary embodiment, the 1st communication protocol may be a 1st Single Wire Protocol (SWP), and the 2nd communication protocol may be a 2nd SWP.

According to one exemplary embodiment, the processor may acquire information on the 2nd SIM from the 2nd SIM through the 2nd communication session, using the short-range communication module, and update a routing table for the plurality of SIMs based on the information on the 2nd SIM.

According to one exemplary embodiment, the routing table may include at least one of names corresponding to the plurality of SIMs, phone numbers, pieces of information representing short-range communication availability or non-availability and information representing coupling or non-coupling with the short-range communication module.

According to one exemplary embodiment, if a new SIM is inserted into the electronic device, the processor may apply a power source to the inserted SIM through the short-range communication module, based on a plurality of reference power source values, and transmit a request for coupling of the inserted SIM to the short-range communication module, and the short-range communication module may activate a 3rd communication protocol between the inserted SIM and the short-range communication module, thereby coupling a 3rd communication session between the inserted SIM and the short-range communication module, in response to the coupling request.

According to one exemplary embodiment, the short-range communication module may establish logical coupling between the inserted SIM and the short-range communication module, in response to the coupling request.

According to one exemplary embodiment, if a designated condition is satisfied, the processor may display a SIM choosing menu on a screen of the electronic device, and if the 2nd SIM is chosen through the SIM choosing menu, the processor may transmit a request for coupling release of the coupled 1st SIM to the short-range communication module.

According to one exemplary embodiment, the processor may automatically choose the 2nd SIM based on at least one of position information of the electronic device and pieces of billing information corresponding to the plurality of SIMs, and transmit a request for coupling release of the coupled 1st SIM to the short-range communication module.

Figure 4:
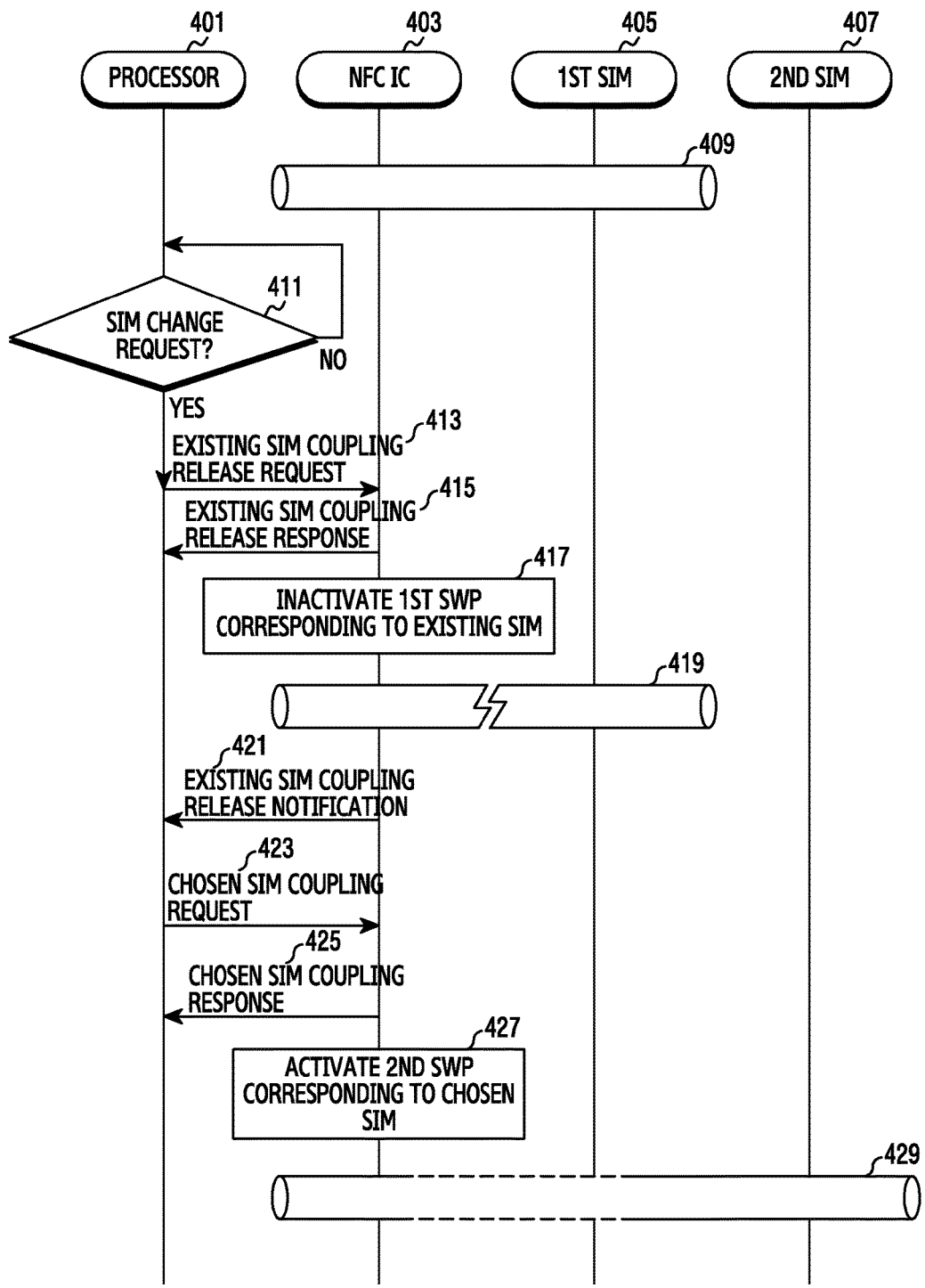
FIG. 4 illustrates a ladder diagram of an operation of choosing a SIM in an electronic device according to various exemplary embodiments.

FIG. 4 illustrates an operation of choosing a SIM in an electronic device according to various exemplary embodiments. For example, the electronic device may be the electronic device 101 illustrated in FIG. 1 or the electronic device 201 illustrated in FIG. 2.

According to one exemplary embodiment, a processor 401 may be the processor 301 illustrated in FIG. 3. According to one exemplary embodiment, an NFC IC 403 may be the NFC IC 307 illustrated in FIG. 3. According to one exemplary embodiment, a 1st SIM 405 may be the 1st SIM 311 illustrated in FIG. 3. According to one exemplary embodiment, a 2nd SIM 407 may be the 2nd SIM 317 illustrated in FIG. 3.

Referring to FIG. 4, in operation 409, the NFC IC 403 may be in a state where a communication session is coupled with the 1st SIM 405. According to one exemplary embodiment, the communication session may represent logical coupling for communication between electronic components (e.g., the NFC IC 403 and the 1st and 2nd SIMs 405 and 407).

In operation 411, the processor 401 may check if a SIM change is requested. According to one exemplary embodiment, the SIM change may be requested by a user. For example, the processor 401 may decide if a situation of satisfying a previously designated 1st condition is sensed. And, if the situation of satisfying the previously designated 1st condition is sensed, the processor 401 may display an NFC SIM choosing menu on a display (e.g., the display 160 of FIG. 1 or the display 260 of FIG. 2) such that a user may choose one SIM among the 1st and 2nd SIMs 405 and 407. If one SIM is chosen by the user through the NFC SIM choosing menu, the processor 401 may decide that the SIM change is requested by the user.

According to one exemplary embodiment, the situation of satisfying the previously designated 1st condition may include at least one, etc. of a case where a request for choice of a SIM that will perform an NFC function is inputted by a user, a case where a SIM supporting the NFC function is inserted into the electronic device 201, and a case where the NFC function is not carried out through a currently set SIM in course of payment.

According to one exemplary embodiment, the SIM change may be requested automatically. For example, the processor 401 may decide if a situation of satisfying a previously designated 2nd condition is sensed. And, if the situation of satisfying the previously designated 2nd condition is sensed, the processor 401 may decide that the SIM change is requested automatically. According to one exemplary embodiment, the situation of satisfying the previously designated 2nd condition may include a case where a SIM that will be coupled with the NFC module 403 is changed based on position information of the electronic device 201, a case where the SIM that will be coupled with the NFC module 403 is changed based on billing information corresponding to the 1st and 2nd SIMs 405 and 407, or the like.

According to one exemplary embodiment, if the SIM change is requested, the processor 401 may proceed to operation 413 and otherwise, repeatedly perform operation 411.

In operation 413, the processor 401 may transmit an existing SIM coupling release request message to the NFC IC 403. According to one exemplary embodiment, the existing SIM may represent a SIM that is in process of being currently coupled with the NFC IC 403. For example, in case where the NFC IC 403 has been coupled with the 1st SIM 405 before the processor 401 makes request for SIM change, the existing SIM may be the 1st SIM 405. According to one exemplary embodiment, the existing SIM coupling release request message may be a message of requesting for logical coupling release between the NFC IC 403 and the existing SIM.

In operation 415, the NFC IC 403 may transmit an existing SIM coupling release response message to the processor 401, in response to the existing SIM coupling release request message. According to one exemplary embodiment, the existing SIM coupling release response message may be a message that represents that the NFC IC 403 successfully receives the existing SIM coupling release request message.

In operation 417 and operation 419, the NFC IC 403 may inactivate a SWP (e.g., 1st SWP) corresponding to the existing SIM (i.e., 1st SIM 405), thereby coupling-releasing a communication session between the NFC IC 403 and the 1st SIM 405. According to one exemplary embodiment, the NFC IC 403 may inactivate the SWP corresponding to the existing SIM, thereby keeping physical or electrical coupling with the existing SIM while releasing logical coupling with the existing SIM.

In operation 421, the NFC IC 403 may transmit an existing SIM coupling release notification message to the processor 401. According to one exemplary embodiment, the existing SIM coupling release notification message may be a message that represents the completion of logical coupling release between the NFC IC 403 and the existing SIM.

In operation 423, the processor 401 may transmit a chosen SIM coupling request message to the NFC IC 403. According to one exemplary embodiment, the chosen SIM may be a SIM that is chosen by a user or automatically in operation 411. According to one exemplary embodiment, the chosen SIM may a SIM that is different from the existing SIM among a plurality of SIMs. For example, in case where the existing SIM is the 1st SIM 405, the chosen SIM may be the 2nd SIM 407.

According to one exemplary embodiment, the chosen SIM coupling request message may be a message of requesting for logical coupling between the NFC IC 403 and the chosen SIM. According to one exemplary embodiment, the chosen SIM coupling request message may include a unique identifier of the chosen SIM.

In operation 425, the NFC IC 403 may transmit a chosen SIM coupling response message to the processor 401, in response to the chosen SIM coupling request message. According to one exemplary embodiment, the chosen SIM coupling response message may be a message that represents that the NFC IC 403 successfully receives the chosen SIM coupling request message.

In operation 427 and operation 429, the NFC IC 403 may activate a SWP (e.g., 2nd SWP) corresponding to the chosen SIM (i.e., the 2nd SIM 407), thereby coupling a communication session between the NFC IC 403 and the 2nd SIM 407. According to one exemplary embodiment, the NFC IC 403 may activate the SWP corresponding to the chosen SIM, thereby establishing logical coupling with the chosen SIM that is physically or electrically coupled.

According to one exemplary embodiment, the NFC IC 403 may transmit a communication session coupling message including a unique identifier of the 2nd SIM 407, to the 1st SIM 405 and the 2nd SIM 407. According to one exemplary embodiment, the 1st and 2nd SIMs 405 and 407 receiving the communication session coupling message each may couple a communication session with the NFC IC 403, based on the result of comparing its own unique identifier and the unique identifier included in the communication session coupling message.

For example, the 2nd SIM 407 may couple a communication session with the NFC IC 403, in that its own unique identifier and the unique identifier included in the communication session coupling message are the same as each other. For example, the 1st SIM 405 may ignore the communication session coupling message, because its own unique identifier and the unique identifier included in the communication session coupling message are not the same as each other.

According to one exemplary embodiment, operations 409 to 429 of FIG. 4 describe that in case where the existing SIM is the 1st SIM 405 and the chosen SIM is the 2nd SIM 407, the electronic device 201 releases logical coupling between the NFC IC 403 and the 1st SIM 405, and establishes logical coupling between the NFC IC 403 and the 2nd SIM 407. However, the present disclosure may not be limited to this. According to one exemplary embodiment, the present disclosure may apply the same scheme as the above even when the existing SIM is the 2nd SIM 407 and the chosen SIM is the 1st SIM 405. For example, the electronic device 201 may release logical coupling between the NFC IC 403 and the 2nd SIM 407, and establish logical coupling between the NFC IC 403 and the 1st SIM 405.

Figure 5:
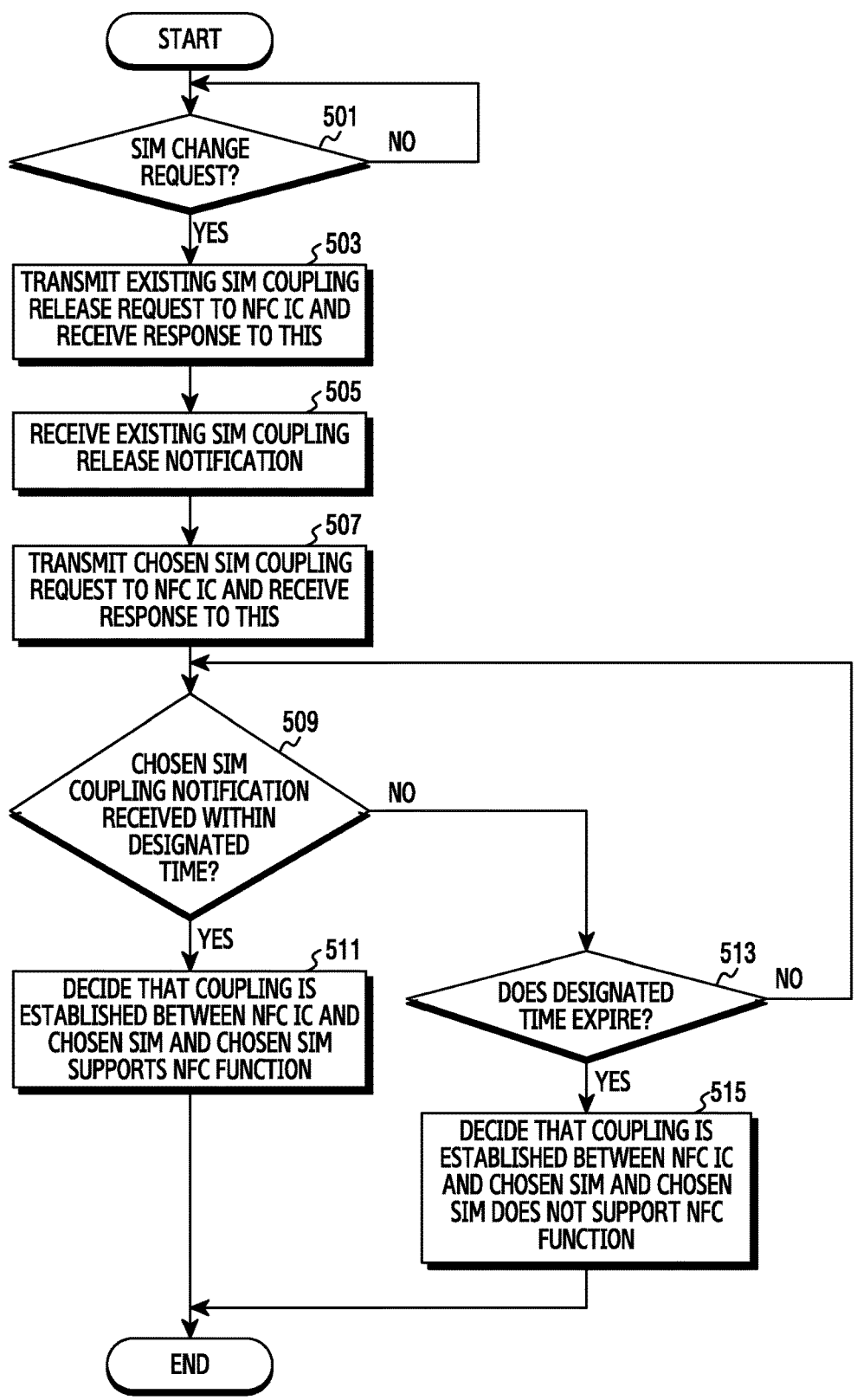
FIG. 5 illustrates an operation of choosing a SIM in a processor according to various exemplary embodiments.

FIG. 5 illustrates an operation of choosing a SIM in a processor according to various exemplary embodiments. For example, the processor may be the processor 401 illustrated in FIG. 4.

Referring to FIG. 5, in operation 501, the processor 401 may check if a SIM change for changing the existing SIM coupled with an NFC IC (e.g., the NFC IC 403) into a chosen SIM is requested. According to one exemplary embodiment, the SIM change may be requested by a user or automatically. For example, in process of coupling a communication session between the NFC IC and a 1st SIM (e.g., the 1st SIM 405), the processor 401 may check if the SIM change is requested. In this case, the existing SIM may be the 1st SIM 405, and a SIM intended to be changed (or a chosen SIM) may be a 2nd SIM (e.g., the 2nd SIM 407). According to one exemplary embodiment, if the SIM change is requested, the processor 401 may proceed to operation 503 and otherwise, repeatedly perform operation 501.

In operation 503, the processor 401 may transmit an existing SIM coupling release request message to the NFC IC 403. According to one exemplary embodiment, the processor 401 may receive an existing SIM coupling release response message from the NFC IC 403, in response to the existing SIM coupling release request message.

In operation 505, the processor 401 may receive an existing SIM coupling release notification message. According to one exemplary embodiment, the processor 401 may decide that logical coupling between the NFC IC 403 and the existing SIM is released, based on the coupling release notification message.

In operation 507, the processor 401 may transmit a chosen SIM coupling request message to the NFC IC 403. According to one exemplary embodiment, the chosen SIM may be a SIM that is chosen automatically or by a user among a plurality of SIMs through the SIM change operation. According to one exemplary embodiment, the processor 401 may receive a chosen SIM coupling response message from the NFC IC 403, in response to the chosen SIM coupling request message.

In operation 509, the processor 401 may check if a chosen SIM coupling notification message is received from the NFC IC 403 within a designated time. According to one exemplary embodiment, the designated time may represent the time ranging from the time of transmission of the chosen SIM coupling request message to a previously designated time (e.g., 0.1 seconds). According to one exemplary embodiment, the designated time may represent the time from the time of reception of the chosen SIM coupling response message to a previously designated time (e.g., 0.1 seconds).

According to one exemplary embodiment, the chosen SIM coupling notification message may be a message that represents logical coupling or non-coupling between the NFC IC 403 and the chosen SIM. According to one exemplary embodiment, the chosen SIM coupling notification message may include information representing logical coupling or non-coupling between the NFC IC 403 and the chosen SIM, and information representing NFC function support or non-support for the chosen SIM. According to one exemplary embodiment, the chosen SIM coupling notification message may include information representing being logically coupled between the NFC IC 403 and the chosen SIM, and information representing that the chosen SIM supports an NFC function.

According to one exemplary embodiment, if the chosen SIM coupling notification message is received, the processor 410 may proceed to operation 511 and otherwise, may proceed to operation 513.

In operation 511, the processor 401 may decide that logical coupling is established between the NFC IC 403 and the chosen SIM, and the chosen SIM supports the NFC function, based on the chosen SIM coupling notification message.

In operation 513, the processor 401 may check if the designated time expires. According to one exemplary embodiment, the processor 401 may use a timer (not shown) of the electronic device 201, to check if the designated time expires.

According to one exemplary embodiment, if the designated time expires, the processor 401 may proceed to operation 515 and otherwise, may proceed to operation 509 and re-check if a chosen SIM coupling notification message is received within the designated time.

In operation 515, the processor 401 may decide that logical coupling has been established between the NFC IC 403 and the chosen SIM, but the chosen SIM does not support the NFC function.

According to one exemplary embodiment, the processor 401 may update a routing table based on the decision result of operation 505. According to one exemplary embodiment, the routing table may be a look-up table that includes information (e.g., communication service provider information, unique identifier information, a phone number, information representing NFC support availability or non-availability, billing information and the like) about a plurality of SIMs, and information representing logical coupling or non-coupling between the NFC IC 403 and a corresponding SIM.

According to one exemplary embodiment, the processor 401 may update coupling information (e.g., from coupling to non-coupling) about the 1st SIM 405, which is included in the routing table.

According to one exemplary embodiment, the processor 401 may update the routing table, based on the decision result of operation 511 or operation 515. According to one exemplary embodiment, the processor 401 may update the chosen SIM NFC information (e.g., NFC function support) and coupling information (e.g., from non-coupling to coupling) that are included in the routing table, based on the decision result of operation 511. According to one exemplary embodiment, the processor 401 may update the chosen SIM NFC information (e.g., NFC function non-support) and coupling information (e.g., from non-coupling to coupling) that are included in the routing table, based on the decision result of operation 515.

Figure 6:
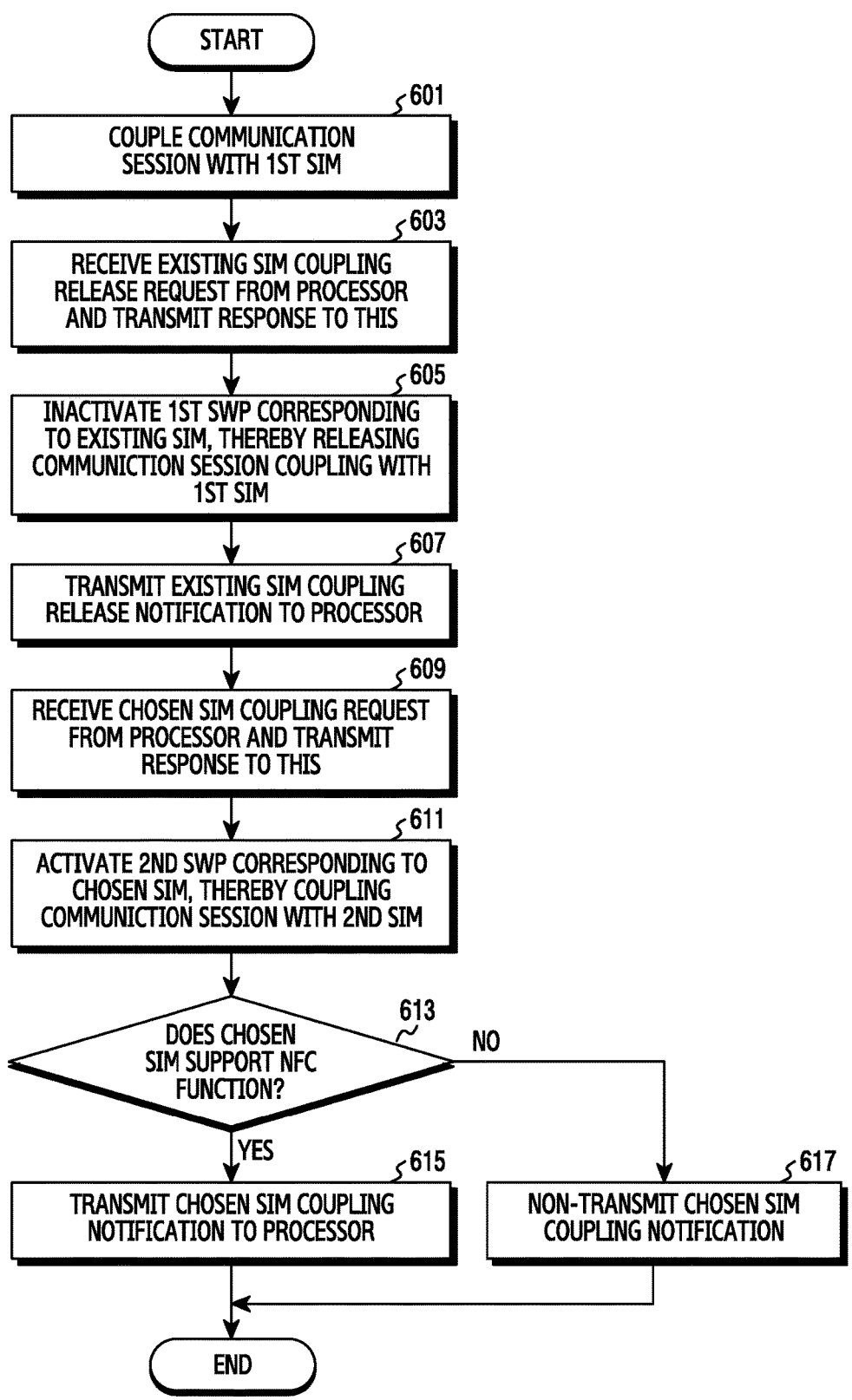
FIG. 6 illustrates an operation of choosing a SIM in an NFC IC according to various exemplary embodiments.

FIG. 6 illustrates an operation of choosing a SIM in an NFC IC according to various exemplary embodiments. For example, the NFC IC may be the NFC IC 403 illustrated in FIG. 4.

Referring to FIG. 6, in operation 601, the NFC IC 403 may couple a communication session with a 1st SIM (e.g., the 1st SIM 405). According to one exemplary embodiment, the NFC IC 403 may activate a 1st SWP corresponding to the 1st SIM 405, thereby logically coupling communication with the 1st SIM 405.

In operation 603, the NFC IC 403 may receive an existing SIM coupling release request message from a processor (e.g., the processor 401). According to one exemplary embodiment, the existing SIM may be the 1st SIM 405, and a chosen SIM may be a 2nd SIM (e.g., the 2nd SIM 407). According to one exemplary embodiment, the NFC IC 403 may transmit an existing SIM coupling release response message to the processor 401, in response to the existing SIM coupling release request message.

In operation 605, the NFC IC 403 may inactivate a SWP (e.g., the 1st SWP) corresponding to the existing SIM (e.g., the 1st SIM 405), thereby releasing communication session coupling with the existing SIM. According to one exemplary embodiment, the NFC IC 403 may inactivate the 1st SWP, thereby keeping physical coupling with the 1st SIM 405 while releasing logical coupling with the 1st SIM 405.

In operation 607, the NFC IC 403 may transmit an existing SIM coupling release notification message to the processor 401. According to one exemplary embodiment, the existing SIM coupling release notification message may be a message that represents that the logical coupling between the NFC IC 403 and the 1st SIM 405 is released.

In operation 609, the NFC IC 403 may receive a chosen SIM coupling request message from the processor 401. According to one exemplary embodiment, the chosen SIM coupling request message may be a message of requesting for logical coupling between the NFC IC 403 and the 2nd SIM 407.

In operation 611, the NFC IC 403 may activate a SWP (e.g., a 2nd SWP) corresponding to the chosen SIM (e.g., the 2nd SIM 407), thereby coupling a communication session with the chosen SIM. According to one exemplary embodiment, the NFC IC 403 may activate the 2nd SWP, thereby establishing logical coupling with the 2nd SIM 407 that has been already physically or electrically coupled In operation 613, the NFC IC 403 may check if the chosen SIM supports an NFC function. According to one exemplary embodiment, the NFC IC 403 may receive NFC information representing NFC function support or non-support from the chosen SIM through the coupled communication session, and check if the chosen SIM supports the NFC function, based on the received NFC information.

According to one exemplary embodiment, if the chosen SIM supports the NFC function, the NFC IC 403 may proceed to operation 615 and otherwise, may proceed to operation 617.

In operation 615, the NFC IC 403 may transmit a chosen SIM coupling notification message to the processor 401. According to one exemplary embodiment, the chosen SIM coupling notification message may include information representing being logically coupled between the NFC IC 403 and the chosen SIM, and information representing that the chosen SIM supports the NFC function.

In operation 617, the NFC IC 403 may non-transmit the chosen SIM coupling notification message to the processor 401. According to one exemplary embodiment, the NFC IC 403 may process not to generate the chosen SIM coupling notification message itself in order to non-transmit the chosen SIM coupling notification message.

Figure 7:
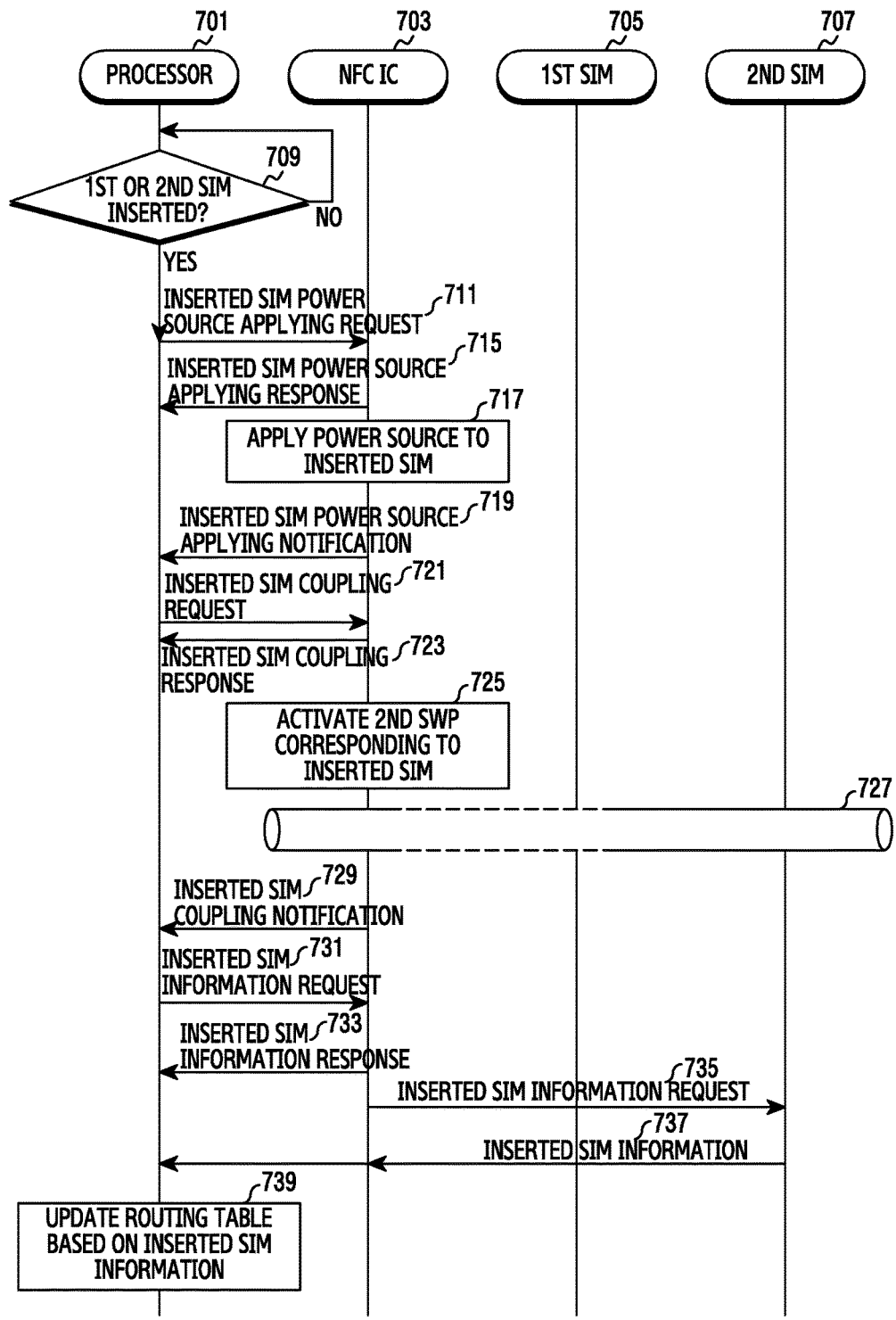
FIG. 7 illustrates a ladder diagram of an operation of updating a routing table for an inserted SIM in an electronic device according to various exemplary embodiments.

FIG. 7 illustrates an operation of updating a routing table for an inserted SIM in an electronic device according to various exemplary embodiments. For example, the electronic device may be the electronic device 101 illustrated in FIG. 1 or the electronic device 201 illustrated in FIG. 2.

According to one exemplary embodiment, a processor 701 may be the processor 301 illustrated in FIG. 3. According to one exemplary embodiment, an NFC IC 703 may be the NFC IC 307 illustrated in FIG. 3. According to one exemplary embodiment, a 1st SIM 705 may be the 1st SIM 311 illustrated in FIG. 3. According to one exemplary embodiment, a 2nd SIM 707 may be the 2nd SIM 317 illustrated in FIG. 3.

Referring to FIG. 7, in operation 709, the processor 701 may check if the 1st SIM 705 or the 2nd SIM 707 is inserted into the electronic device 201. According to one exemplary embodiment, if the 1st SIM 705 or the 2nd SIM 707 is inserted, the processor 701 may proceed to operation 711 and otherwise, may repeatedly perform operation 709.

According to one exemplary embodiment, if the 1st SIM 705 or the 2nd SIM 707 is inserted, the NFC IC 703 may be physically or electrically coupled with the inserted SIM through a data line (e.g., the 1st data line 315 or the 2nd data line 321) corresponding to the inserted SIM.

In operation 711, the processor 701 may transmit an inserted SIM power source applying request message to the NFC IC 703. According to one exemplary embodiment, the inserted SIM power source applying request message may be a message of requesting the NFC IC 703 to apply a power source to the inserted SIM. According to one exemplary embodiment, the inserted SIM may be the 2nd SIM 707.

In operation 715, the NFC IC 703 may transmit an inserted SIM power source applying response message to the processor 701, in response to the inserted SIM power source applying request message. According to one exemplary embodiment, the inserted SIM power source applying response message may be a message that represents that the NFC IC 703 successfully receives the inserted SIM power source applying request message.

In operation 717, the NFC IC 703 may apply a power source to the inserted SIM. According to one exemplary embodiment, the NFC IC 703 cannot acquire power source information about the inactivated inserted SIM and therefore, cannot check a power source value (or voltage value) for activating the inserted SIM. Accordingly to this, the NFC IC 703 may change designated power source values (e.g., 3.0V and 1.8V) in sequence while applying a power source to the inserted SIM. That is because a power source value of a commercialized SIM is one of 3.0V or 1.8V.

According to one exemplary embodiment, if the inserted SIM is activated after the NFC IC 703 applies a power source of 1.8V to the inserted SIM, the NFC IC 703 may decide a power source value of the inserted SIM as 1.8V and maintain the applied power source. According to one exemplary embodiment, if the inserted SIM is not activated, the NFC IC 703 may decide the power source value of the inserted SIM as 3.0V and change the power source of 1.8V into the power source of 3.0V and then, apply the changed power source to the inserted SIM.

According to one exemplary embodiment, if the inserted SIM is activated after the NFC IC 703 applies a power source of 3.0V to the inserted SIM, the NFC IC 703 may decide a power source value of the inserted SIM as 3.0V and maintain the applied power source. According to one exemplary embodiment, if the inserted SIM is not activated, the NFC IC 703 may decide the power source value of the inserted SIM as 1.8V and change the power source of 3.0V into the power source of 1.8 V and then, apply the changed power source to the inserted SIM.

In operation 719, the NFC IC 703 may transmit an inserted SIM power source applying notification message to the processor 701. According to one exemplary embodiment, the inserted SIM power source applying notification message may be a message that represents applying a power source to the inserted SIM.

In operation 721, the processor 701 may transmit an inserted SIM coupling request message to the NFC IC 703. According to one exemplary embodiment, the inserted SIM coupling request message may be a message of requesting for logical coupling between the NFC IC 703 and the inserted SIM.

In operation 723, the NFC IC 703 may transmit an inserted SIM coupling response message to the processor 701, in response to the inserted SIM coupling request message. According to one exemplary embodiment, the inserted SIM coupling response message may be a message that represents that the NFC IC 703 successfully receives the inserted SIM coupling request message.

In operation 725 and operation 727, the NFC IC 703 may activate a SWP (e.g., 2nd SWP) corresponding to the inserted SIM (i.e., 2nd SIM 707), thereby coupling a communication session between the NFC IC 703 and the inserted SIM. According to one exemplary embodiment, the NFC IC 703 may activate the SWP corresponding to the inserted SIM, thereby logically coupling with the inserted SIM that has been already physically or electrically coupled.

In operation 729, the NFC IC 703 may transmit an inserted SIM coupling notification message to the processor 701. According to one exemplary embodiment, the inserted SIM coupling notification message may be a message that represents that the NFC IC 703 completes logical coupling with the inserted SIM.

In operation 731, the processor 701 may transmit an inserted SIM information request message to the NFC IC 703. According to one exemplary embodiment, the inserted SIM information request message may be a message of requesting for information (e.g., at least one, etc. of communication service provider information, billing information, a phone number, and/or NFC information) about the inserted SIM.

In operation 733, the NFC IC 703 may transmit an inserted SIM information response message to the processor 701, in response to the inserted SIM information request message. According to one exemplary embodiment, the inserted SIM information response message may be a message that represents that the NFC IC 703 successfully receives the inserted SIM information request message.

In operation 735, the NFC IC 703 may transmit the inserted SIM information request message to the inserted SIM through the coupled communication session.

In operation 737, the NFC IC 703 may receive inserted SIM information from the inserted SIM through the coupled communication session, in response to the inserted SIM information request message, and transmit the inserted SIM information to the processor 701.

In operation 739, the processor 701 may update a routing table based on the inserted SIM information. According to one exemplary embodiment, the processor 701 may update the routing table such that the inserted SIM information is included in the routing table. According to one exemplary embodiment, the processor 701 may update the routing table such that the routing table includes information (e.g., at least one of a SIM name, a phone number, coupling information, NFC information and billing information) on the inserted SIM.

According to one exemplary embodiment, operations 709 to 737 of FIG. 7 describe that in case where the inserted SIM is the 2nd SIM 707, the electronic device 201 logically couples between the NFC IC 703 and the 2nd SIM 707 and then, acquires information about the 2nd SIM 707 from the 2nd SIM 707 and tables the acquired information. However, the present disclosure may not be limited to this. According to one exemplary embodiment, the present disclosure may apply the same or similar scheme with the above even in case where the inserted SIM is the 1st SIM 705. For example, the electronic device 201 may logically couple between the NFC IC 703 and the 1st SIM 705 and then, acquire information about the 1st SIM 705 from the 1st SIM 705 and table the acquired information.

According to one exemplary embodiment, even in case where a new SIM is inserted into the electronic device 201 when the existing SIM exists within the electronic device 201, the electronic device 201 may apply the similar scheme with the above, thereby acquiring and tabling information about the inserted SIM.

According to one exemplary embodiment, the processor 701 may check if the NFC IC 703 has been logically coupled with the existing SIM, based on the routing table. According to one exemplary embodiment, in case where the NFC IC 703 has not been logically coupled with the existing SIM, the processor 701 may immediately transmit an inserted SIM coupling request message.

According to one exemplary embodiment, in case where the NFC IC 703 has been logically coupled with the existing SIM, the processor 701 may release logical coupling between the NFC IC 703 and the existing SIM through the NFC IC 703, and establish logical coupling between the NFC IC 703 and the inserted SIM. According to one exemplary embodiment, the processor 701 may acquire information about the inserted SIM, and update the routing table based on the acquired information. According to one exemplary embodiment, the processor 701 may release logical coupling between the inserted SIM and the NFC IC 703 through the NFC IC 703 and then, again establish logical coupling between the NFC IC 703 and the existing SIM.

Figure 8:
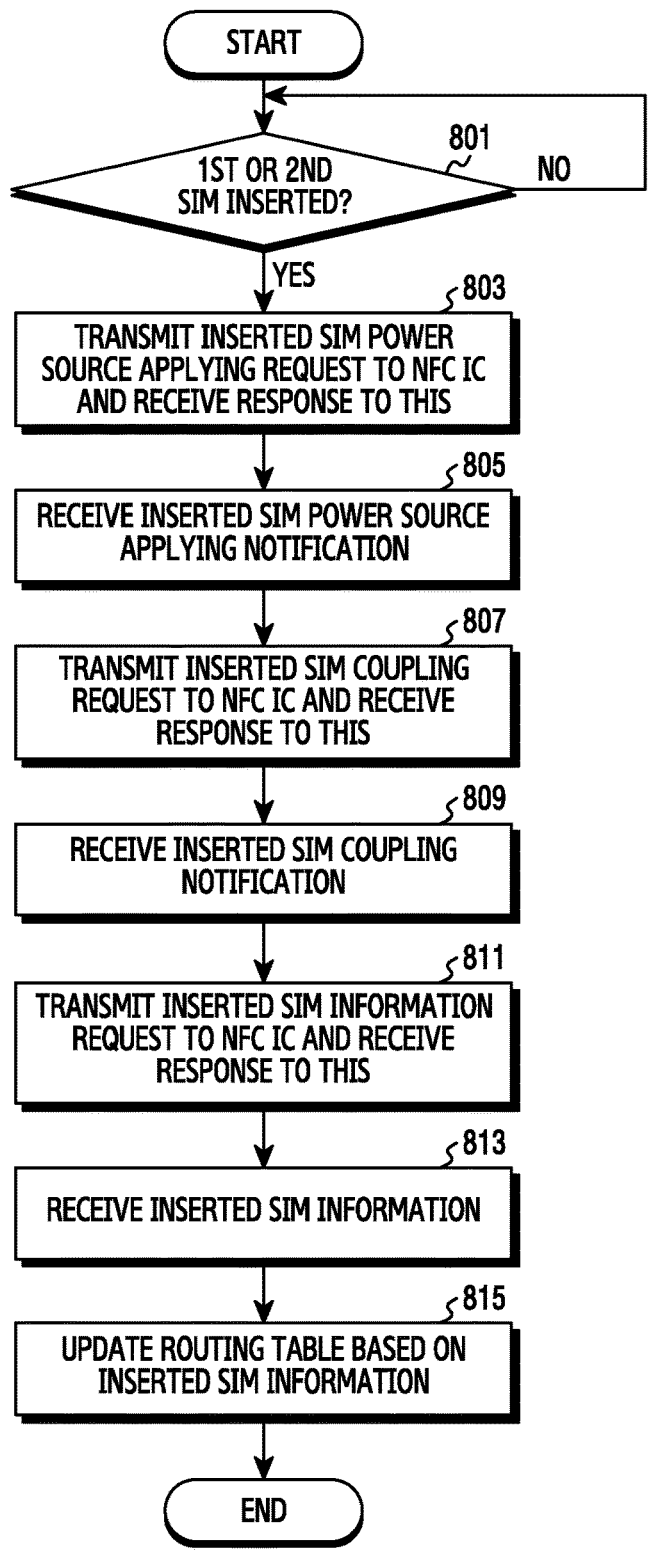
FIG. 8 illustrates an operation of updating a routing table for an inserted SIM in a processor according to various exemplary embodiments.

FIG. 8 illustrates an operation of updating a routing table for an inserted SIM in a processor according to various exemplary embodiments. For example, the processor may be the processor 701 illustrated in FIG. 7.

Referring to FIG. 8, in operation 801, the processor 701 may check if a 1st SIM (e.g., the 1st SIM 705) or a 2nd SIM (e.g., the 2nd SIM 707) is inserted into an electronic device (e.g., the electronic device 201). According to one exemplary embodiment, if the 1st SIM 705 or the 2nd SIM 707 is inserted, the processor 701 may proceed to operation 803 and otherwise, may repeatedly perform operation 801.

In operation 803, the processor 701 may transmit an inserted SIM power source applying request message to an NFC IC (e.g., the NFC IC 703). According to one exemplary embodiment, the processor 701 may receive an inserted SIM power source applying response message from the NFC IC 703, in response to the inserted SIM power source applying request message. According to one exemplary embodiment, the inserted SIM may be the 2nd SIM 707.

In operation 805, the processor 701 may receive an inserted SIM power source applying notification message from the NFC IC 703. According to one exemplary embodiment, the processor 701 may decide that a power source is applied to the inserted SIM, based on the inserted SIM power source applying notification message.

In operation 807, the processor 701 may transmit an inserted SIM coupling request message to the NFC IC 703. According to one exemplary embodiment, the processor 701 may receive an inserted SIM coupling response message from the NFC IC 703, in response to the inserted SIM coupling request message.

In operation 809, the processor 701 may receive an inserted SIM coupling notification message from the NFC IC 703. According to one exemplary embodiment, the processor 701 may decide that logical coupling between the NFC IC 703 and the inserted SIM is established, based on the inserted SIM coupling notification message.

In operation 811, the processor 701 may transmit an inserted SIM information request message to the NFC IC 703. According to one exemplary embodiment, the processor 701 may receive an inserted SIM information response message from the NFC IC 703, in response to the inserted SIM information request message.

In operation 813, the processor 701 may receive inserted SIM information from the inserted SIM through the NFC IC 703. In operation 815, the processor 701 may update a routing table, based on the inserted SIM information. According to one exemplary embodiment, the routing table may be stored in a memory (e.g., the memory 130 or the memory 230).

Figure 9:
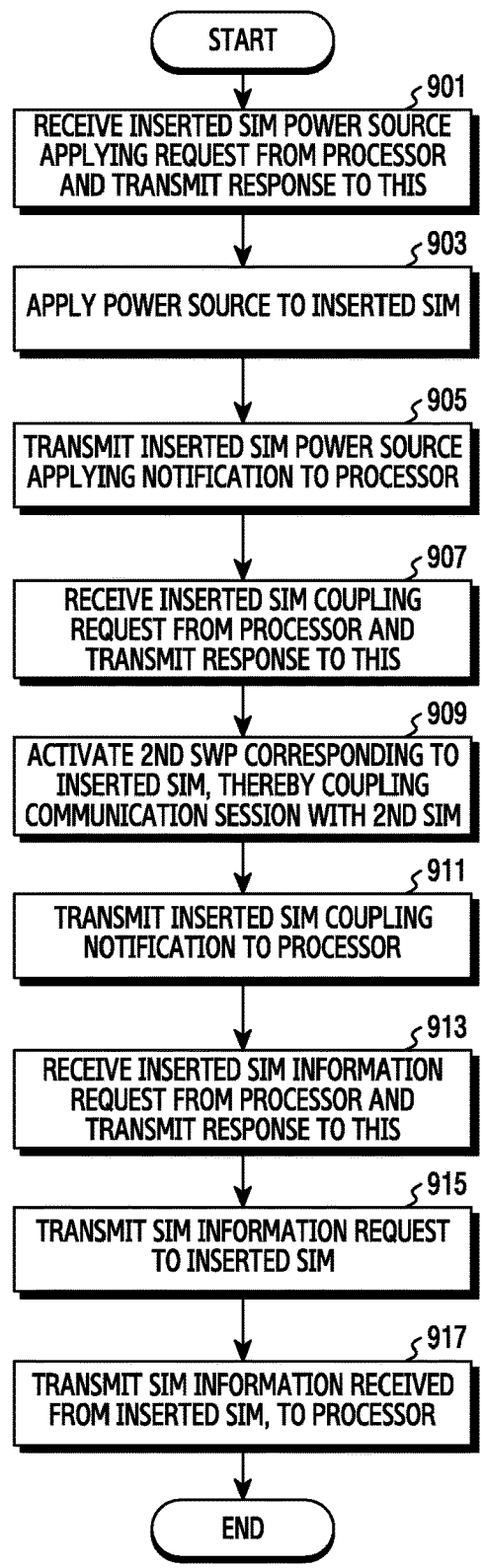
FIG. 9 illustrates an operation of transmitting inserted SIM information in an NFC IC according to various exemplary embodiments.

FIG. 9 illustrates an operation of transmitting inserted SIM information in an NFC IC according to various exemplary embodiments. For example, the NFC IC may be the NFC IC 703 illustrated in FIG. 7.

Referring to FIG. 9, in operation 901, the NFC IC 703 may receive an inserted SIM power source applying request message from a processor (e.g. the processor 701). According to one exemplary embodiment, the NFC IC 703 may transmit an inserted SIM power source applying response message to the processor 701, in response to the inserted SIM power source applying request message. According to one exemplary embodiment, the inserted SIM may be a 2nd SIM (e.g., the 2nd SIM 707). According to one exemplary embodiment, if a new SIM is inserted, the NFC IC 703 may be physically or electrically coupled with the inserted SIM through a data line (e.g., the 1st data line 315 or the 2nd data line 321).

In operation 903, the NFC IC 703 may apply a power source to the inserted SIM. Accordingly to one exemplary embodiment, the NFC IC 703 may change specific power source values (e.g., 3.0V and 1.8V) in sequence while applying a power source to the inserted SIM. In operation 905, the NFC IC 703 may transmit an inserted SIM power source applying notification message to the processor 701.

In operation 907, the NFC IC 703 may receive an inserted SIM coupling request message from the processor 701. According to one exemplary embodiment, the NFC IC 703 may transmit an inserted SIM coupling response message to the processor 701, in response to the inserted SIM coupling request message.

In operation 909, the NFC IC 703 may activate a SWP (e.g., a 2nd SWP) corresponding to the inserted SIM (e.g., the 2nd SIM 707), thereby coupling a communication session with the inserted SIM. According to one exemplary embodiment, the NFC IC 703 may activate the 2nd SWP corresponding to the 2nd SIM 707, thereby establishing logical coupling with the 2nd SIM 707 that has been already physically or electrically coupled. In operation 911, the NFC IC 703 may transmit an inserted SIM coupling notification message to the processor 701.

In operation 913, the NFC IC 703 may receive an inserted SIM information request message from the processor 701. According to one exemplary embodiment, the NFC IC 703 may transmit an inserted SIM information response message to the processor 701, in response to the inserted SIM information request message.

In operation 915, the NFC IC 703 may transmit the inserted SIM information request message to the inserted SIM through the coupled communication session. In operation 917, the NFC IC 703 may receive inserted SIM information from the inserted SIM through the coupled communication session, and transmit the inserted SIM information to the processor 701.

Figure 10:
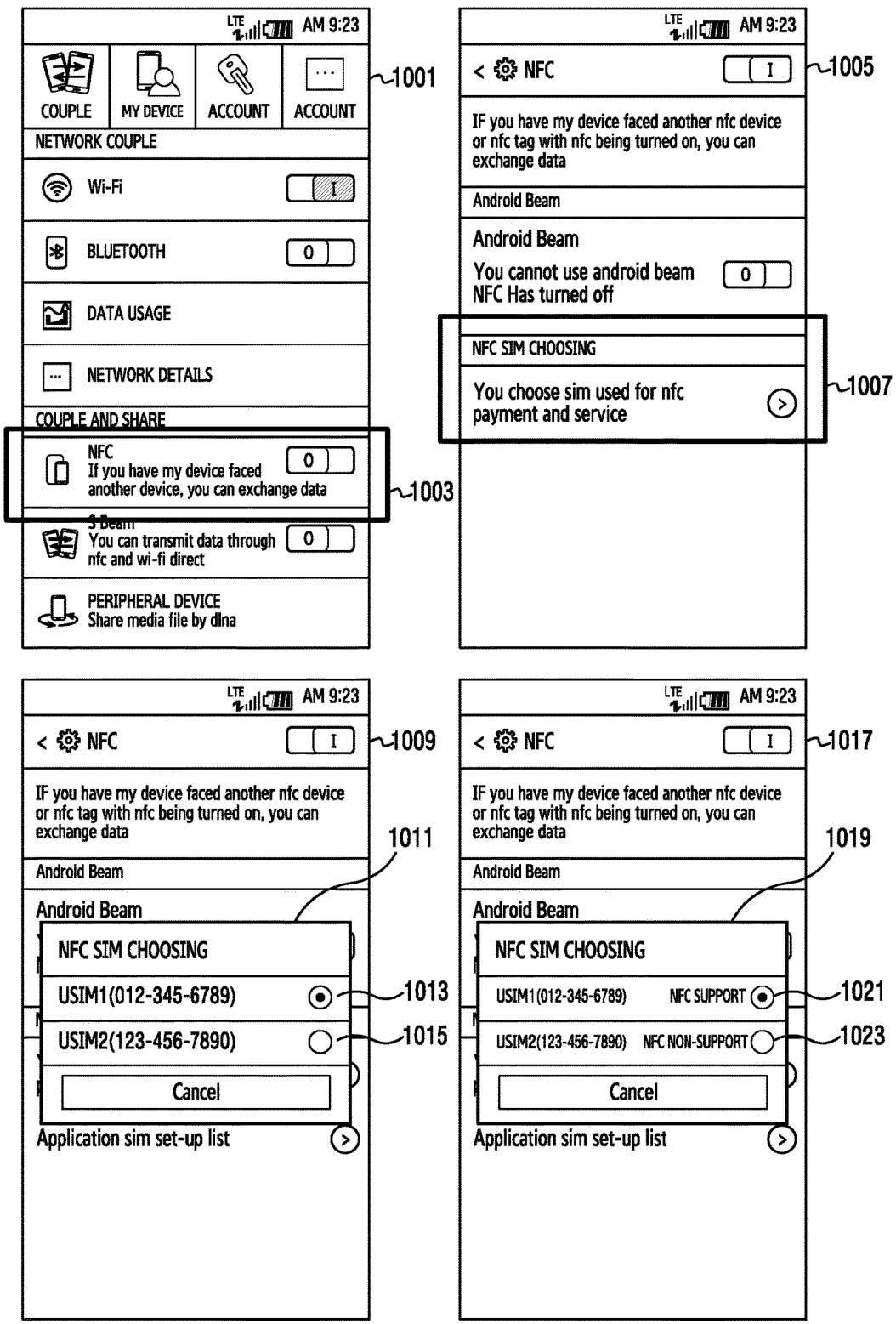
FIG. 10 to FIG. 12 illustrate screens of displaying SIM choosing menus in an electronic device according to various exemplary embodiments.
Figure 11:
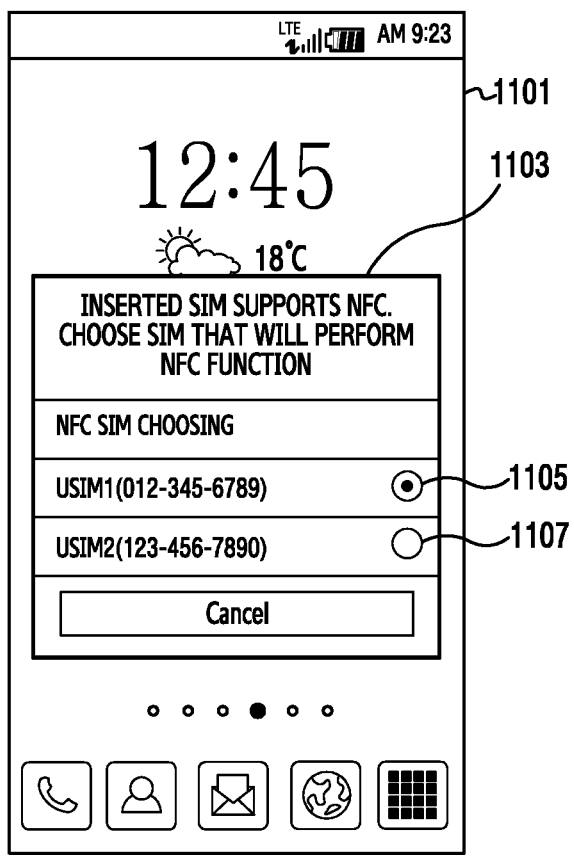
Figure 12:
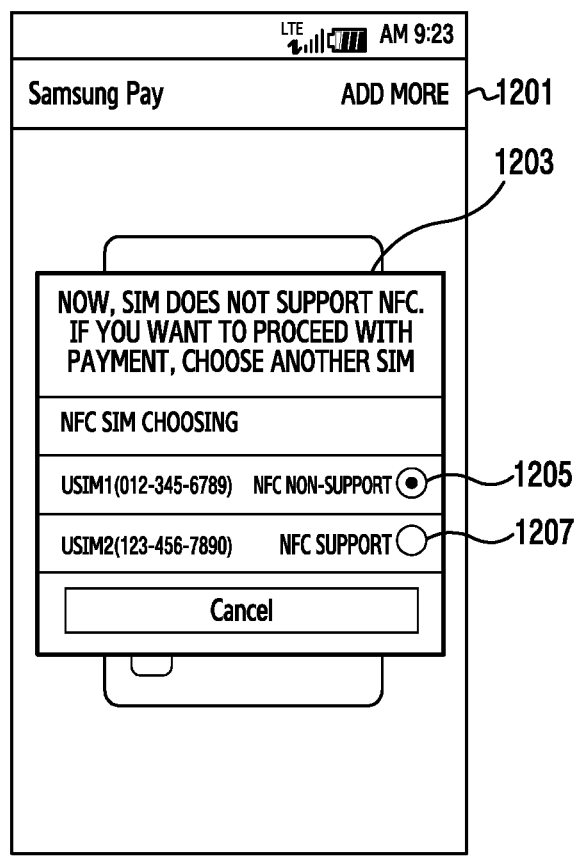

FIG. 10 to FIG. 12 illustrate screens of displaying SIM choosing menus in an electronic device according to various exemplary embodiments. For example, the electronic device may be the electronic device 101 illustrated in FIG. 1 or the electronic device 201 illustrated in FIG. 2.

Referring to FIG. 10 to FIG. 12, the electronic device 201 may display a SIM choosing menu so as to make a user choose a SIM that will be coupled with an NFC module (e.g., the NFC module 228) among a plurality of SIMs provided in the electronic device 201.

Referring to FIG. 10, the electronic device 201 may display a menu related with a network on a display (e.g., the display 260), as in a screen 1001. According to one exemplary embodiment, the network related menu may be a menu related with a communication network (e.g., Wi-Fi, Bluetooth, NFC, etc.) that can be provided in the electronic device 201. According to one exemplary embodiment, the network related menu may include an NFC menu 1003 for requesting NFC set-up.

According to one exemplary embodiment, if the NFC menu 1003 is selected, the electronic device 201 may display an NFC set-up menu for setting up NFC on the display 260, as in a screen 1005. According to one exemplary embodiment, the NFC set-up menu may include an NFC SIM choice request menu 1007 for requesting for choosing one SIM among a plurality of SIMs.

According to one exemplary embodiment, if the NFC SIM choice request menu 1007 is selected, the electronic device 201 may display an NFC SIM choosing menu 1011 on the display 260, as in a screen 1009. According to one exemplary embodiment, the electronic device 201 may generate and display the NFC SIM choosing menu 1011, based on a routing table stored in a memory (e.g., the memory 230).

According to one exemplary embodiment, the NFC SIM choosing menu 1011 may include detailed information 1013 and 1015 corresponding to the plurality of SIMs. According to one exemplary embodiment, the detailed information 1013 and 1015 each may include a name of a corresponding SIM, a phone number and an indicator (e.g., an icon or image) representing coupling or non-coupling between the corresponding SIM and the NFC module 228. According to one exemplary embodiment, the detailed information 1013 corresponding to a 1st SIM (e.g., the 1st SIM 224) may include an indicator representing being a state of being currently logically coupled between the 1st SIM 224 and the NFC module 228, and the detailed information 1015 corresponding to a 2nd SIM (e.g., the 2nd SIM 226) may include an indicator representing being a state of being currently logically decoupled between the 2nd SIM 226 and the NFC module 228.

According to one exemplary embodiment, if the currently logically coupled 1st SIM 224 is chosen in the NFC SIM choosing menu 1011 (e.g., if a display region or cancel region of choice information 1013 corresponding to the 1st SIM 224 is touched by a user), the electronic device 201 may decide to maintain coupling between the NFC module 228 and the 1st SIM 224.

According to one exemplary embodiment, if the currently logically decoupled 2nd SIM 226 is chosen in the NFC SIM choosing menu 1011 (e.g., if a display region of choice information 1015 corresponding to the 2nd SIM 226 is touched by the user), the electronic device 201 may decide a SIM that will logically couple with the NFC module 228, as the 2nd SIM 226. According to one exemplary embodiment, the electronic device 201 may release logical coupling between the 1st SIM 224 and the NFC module 228, and logically couple between the 2nd SIM 226 and the NFC module 228.

According to one exemplary embodiment, the information included in the NFC SIM choosing menu 1011 may be changed dynamically. According to one exemplary embodiment, if the NFC SIM choice request menu 1007 is selected, the electronic device 201 may display an NFC SIM choosing menu 1019 on the display 260, as in a screen 1017. According to one exemplary embodiment, the NFC SIM choosing menu 1019 may include detailed information 1021 and 1023 corresponding to the plurality of SIMs. According to one exemplary embodiment, compared to the detailed information 1013 and 1015, the detailed information 1021 and 1023 each may further include NFC information representing NFC support or non-support, so as to help user's SIM choice.

Referring to FIG. 11, if a new SIM supporting an NFC function is inserted into the electronic device 201, the electronic device 201 may display an NFC SIM choosing menu 1103 on the display 260, as in a screen 1101. According to one exemplary embodiment, after the new SIM is inserted, if the electronic device 201 is powered On, the electronic device 201 may display the NFC SIM choosing menu 1103 on the background screen.

According to one exemplary embodiment, the NFC SIM choosing menu 1103 may include detailed information 1105 and 1107 corresponding to a plurality of SIMs, together with the notice "The inserted SIM supports NFC. Choose SIM that will perform NFC function". According to one exemplary embodiment, if the inserted SIM (e.g., the 2nd SIM 226) is chosen among the plurality of SIMs, the electronic device 201 may decide a SIM that will couple with the NFC module 228 as the 2nd SIM 226. According to one exemplary embodiment, the electronic device 201 may release logical coupling between the 1st SIM 224 and the NFC module 228, and logically couple between the 2nd SIM 226 and the NFC module 228.

According to one exemplary embodiment, if the existing SIM (e.g., the 1st SIM 224) is chosen among the plurality of SIMs, the electronic device 201 may decide to maintain coupling between the NFC module 228 and the 1st SIM 224.

Referring to FIG. 12, in case where when card payment is made using a card payment application (e.g., Samsung Pay), a SIM (e.g., the 1st SIM 224) currently coupled with the NFC module 228 does not support NFC or an NFC function is not performed using the currently coupled SIM, the electronic device 201 may display an NFC SIM choosing menu 1203.

According to one exemplary embodiment, the NFC SIM choosing menu 1203 may include detailed information 1205 and 1207 corresponding to a plurality of SIMs, together with the notice "The currently coupled SIM does not support NFC. Choose another SIM". According to one exemplary embodiment, if another SIM (e.g., the 2nd SIM 226) is chosen among the plurality of SIMs, the electronic device 201 may decide a SIM that will couple with the NFC module 228 as the 2nd SIM 226. According to one exemplary embodiment, the electronic device 201 may release logical coupling between the 1st SIM 224 and the NFC module 228, and logically couple between the 2nd SIM 226 and the NFC module 228.

According to one exemplary embodiment, if the currently coupled SIM is chosen among the plurality of SIMs, the electronic device 201 may decide to maintain coupling between the NFC module 228 and the 1st SIM 224.

Figure 13:
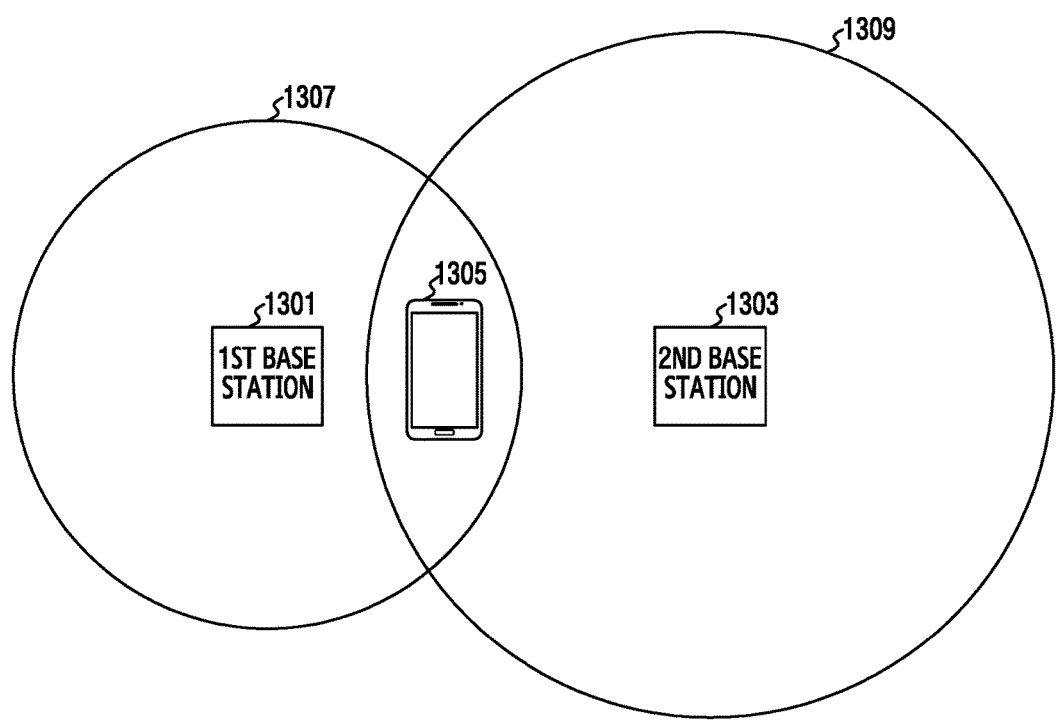
FIG. 13 and FIG. 14 illustrate communication systems according to various exemplary embodiments.
Figure 14:
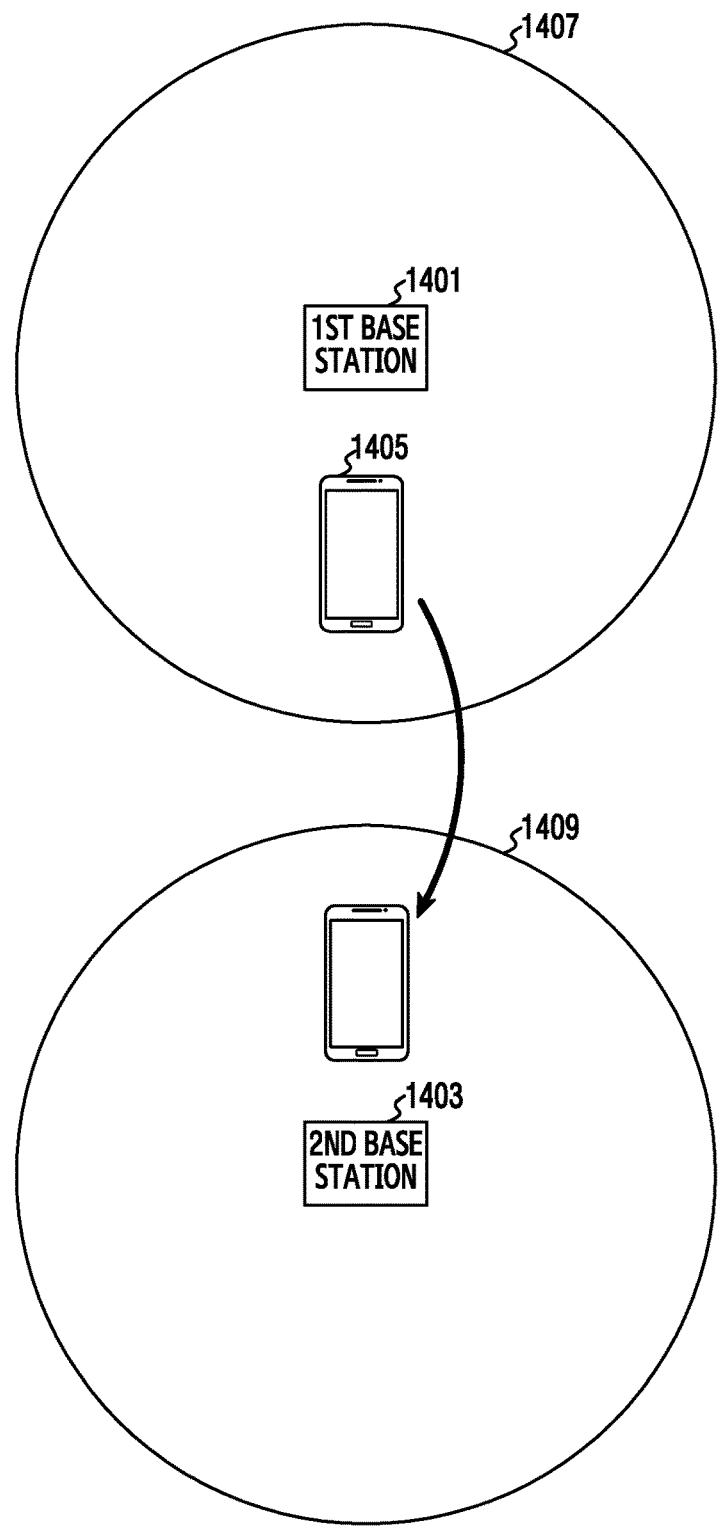

FIG. 13 and FIG. 14 illustrate communication systems according to various exemplary embodiments.

Referring to FIG. 13, a communication system may include a 1st base station 1301, a 2nd base station 1303, and an electronic device 1305. For example, the electronic device 1305 may be the electronic device 101 illustrated in FIG. 1 or the electronic device 201 illustrated in FIG. 2.

According to one exemplary embodiment, the 1st base station 1301 and the 2nd base station 1303 may belong to the same Radio Access Technology (RAT) that is provided by mutually different communication service providers. According to one exemplary embodiment, the RAT may include a 1st-generation communication technology, a 2nd-generation communication technology, a 3rd-generation communication technology, a 4th-generation communication technology (e.g., Long Term Evolution (LTE)), a 5th-generation communication technology, etc. According to one exemplary embodiment, the 1st base station 1301 may belong to an LTE network that is provided by the 1st communication service provider (e.g., South Korean SK Telecom). According to one exemplary embodiment, the 2nd base station 1303 may belong to an LTE network that is provided by the 2nd communication service provider (e.g., South Korean KT Telecom).

According to one exemplary embodiment, the 1st base station 1301 and the 2nd base station 1303 may belong to mutually different RATs that are provided by mutually different communication service providers. According to one exemplary embodiment, the 1st base station 1301 may belong to an LTE network that is provided by the 1st communication service provider (e.g., South Korean SK Telecom). According to one exemplary embodiment, the 2nd base station 1303 may belong to a 3rd-generation communication network that is provided by the 2nd communication service provider (e.g., South Korean KT Telecom).

According to one exemplary embodiment, the 1st base station 1301 may have a 1st cell 1307, and the 2nd base station 1303 may have a 2nd cell 1309. According to one exemplary embodiment, the electronic device 1305 may be located within an overlapped area between the 1st cell 1307 and the 2nd cell 1309. According to one exemplary embodiment, the electronic device 1305 may include a plurality of SIMs (e.g., the 1st SIM 224 and the 2nd SIM 226). According to one exemplary embodiment, the 1st SIM 224 may include information (e.g., billing information) about the 1st communication service provider such that it can perform communication with the 1st base station 1301, and the 2nd SIM 226 may include information (e.g., billing information) about the 2nd communication service provider such that it can perform communication with the 2nd base station 1303.

According to one exemplary embodiment, the electronic device 1305 may decide a SIM that will be coupled with an NFC module (e.g., the NFC module 228) among the plurality of SIMs 224 and 226, based on billing information corresponding to the plurality of SIMs 224 and 226. According to one exemplary embodiment, the electronic device 1305 may compare the billing information, thereby deciding low-charge billing information among the billing information, and decide a SIM corresponding to the decided billing information as a SIM that will be coupled with the NFC module 228.

According to one exemplary embodiment, the electronic device 1305 may automatically attempt to logically couple the decided SIM with the NFC module 228. According to one exemplary embodiment, in case where the decided SIM has been currently logically coupled with the NFC module 228, the electronic device 1305 may keep logical coupling between the NFC module 228 and the decided SIM as it is. According to one exemplary embodiment, in case where the decided SIM has been currently logically decoupled with the NFC module 228, the electronic device 1305 may automatically attempt logical coupling between the NFC module 228 and the decided SIM.

Referring to FIG. 14, a communication system may include a 1st base station 1401, a 2nd base station 1403, and an electronic device 1405. For example, the electronic device 1405 may be the electronic device 101 illustrated in FIG. 1 or the electronic device 201 illustrated in FIG. 2.

According to one exemplary embodiment, the 1st base station 1401 and the 2nd base station 1403 may belong to the same RAT or mutually different RATs that are provided by mutually different communication service providers. According to one exemplary embodiment, the 1st base station 1401 and the 2nd base station 1403 may be located in regionally mutually different locations (e.g., mutually different countries). According to one exemplary embodiment, the 1st base station 1401 may have a 1st cell 1407, and the 2nd base station 1403 may have a 2nd cell 1409.

According to one exemplary embodiment, the electronic device 1405 may include a plurality of SIMs (e.g., the 1st SIM 224 and the 2nd SIM 226). According to one exemplary embodiment, the 1st SIM 224 may include information about the 1st communication service provider such that it can perform communication with the 1st base station 1401, and the 2nd SIM 226 may include information about the 2nd communication service provider such that it can perform communication with the 2nd base station 1403.

According to one exemplary embodiment, in case where the electronic device 1405 moves from the 1st cell 1407 to the 2nd cell 1409, the electronic device 1405 may decide a SIM that will be coupled with an NFC module (e.g., the NFC module 228) among a plurality of SIMs 224 and 226, based on position information of the electronic device 1405. According to one exemplary embodiment, the position information may be acquired using a GNSS module (e.g., the GNSS module 227). According to one exemplary embodiment, the electronic device 1405 may decide a base station (e.g., the 2nd base station 1403) that is located around the electronic device 1405, based on the position information of the electronic device 1405, and decide a SIM (e.g., the 2nd SIM 226) corresponding to the decided base station as a SIM that will be coupled with the NFC module 228.

According to one exemplary embodiment, the electronic device 1405 may automatically attempt to logically couple the decided SIM with the NFC module 228. According to one exemplary embodiment, in case where the decided SIM has been currently logically coupled with the NFC module 228, the electronic device 1405 may maintain logical coupling between the NFC module 228 and the decided SIM as it is. According to one exemplary embodiment, in case where the decided SIM has been currently logically decoupled with the NFC module 228, the electronic device 1405 may automatically attempt logical coupling between the NFC module 228 and the decided SIM.

According to one exemplary embodiment, a method for operating in an electronic device may include the operations of sensing a request for change from a currently coupled 1st Subscriber Identify Module (SIM) to a 2nd SIM among a plurality of SIMs, inactivating a 1st communication protocol between the 1st SIM and a short-range communication module in response to the change request, to release a 1st communication session with the 1st SIM, and activating a 2nd communication protocol between the 2nd SIM and the short-range communication module, to couple a 2nd communication session with the 2nd SIM.

According to one exemplary embodiment, the operation of releasing the 1st communication session may be the operation of releasing logical coupling between the 1st SIM and the short-range communication module.

According to one exemplary embodiment, the operation of coupling the 2nd communication session may be the operation of establishing logical coupling between the 2nd SIM and the short-range communication module.

According to one exemplary embodiment, the 1st communication protocol may be a 1st Single Wire Protocol (SWP), and the 2nd communication protocol may be a 2nd SWP.

According to one exemplary embodiment, the method may further include the operations of acquiring information on a 2nd SIM from the 2nd SIM through the 2nd communication session, and updating a routing table for the plurality of SIMs based on the information on the 2nd SIM.

According to one exemplary embodiment, the routing table may include at least one of names corresponding to the plurality of SIMs, phone numbers, pieces of information representing short-range communication availability or non-availability and information representing coupling or non-coupling with the short-range communication module.

According to one exemplary embodiment, the method may further include the operations of sensing that a new SIM is inserted into the electronic device, applying a power source to the inserted SIM, based on a plurality of reference power source values, and in response to a request for coupling of the inserted SIM, activating a 3rd communication protocol between the inserted SIM and the short-range communication module, thereby coupling a 3rd communication session with the inserted SIM.

According to one exemplary embodiment, the operation of coupling the 3rd communication session may be the operation of establishing logical coupling between the inserted SIM and the short-range communication module.

According to one exemplary embodiment, the operation of sensing the request for the change from the currently coupled 1st SIM to the 2nd SIM among the plurality of SIMs may include the operations of if a designated condition is satisfied, displaying a SIM choosing menu on a screen of the electronic device, and if the 2nd SIM is chosen through the SIM choosing menu, transmitting a request for coupling release of the coupled 1st SIM to the short-range communication module.

According to one exemplary embodiment, the operation of sensing the request for the change from the currently coupled 1st SIM to the 2nd SIM among the plurality of SIMs may include the operations of checking if the 2nd SIM is automatically chosen based on at least one of position information of the electronic device and pieces of billing information corresponding to the plurality of SIMs, and if the 2nd SIM is chosen, transmitting a request for coupling release of the coupled 1st SIM to the short-range communication module.

In accordance with various exemplary embodiments, the present disclosure may choose one of a plurality of SIMs and perform an NFC function, thereby enhancing a user's convenience in an electronic device.

In accordance with various exemplary embodiments, the present disclosure may efficiently couple and release between a plurality of SIMs and an NFC module, thereby providing an effective communication way between the plurality of SIMs and the NFC module.

The term "module" used in various embodiments of the present disclosure can imply a unit including hardware, software, and firmware or any suitable combination. The "module" can be interchangeably used with a term such as a unit, logic, a logical block, a component, a circuit, and the like. The "module" can be a minimum unit of an integral component or can be a part thereof. The "module" can be a minimum unit for performing one or more functions or may be a part thereof. The "module" can be mechanically or electrically implemented. For example, the "module" according to various embodiments of the present disclosure can include at least one of an Application-Specific Integrated Circuit (ASIC) chip, a Field-Programmable Gate Arrays (FPGAs), and a programmable-logic device, which are known or will be developed and which perform certain operations. At least some parts of a device (e.g., modules or functions thereof) or a method (e.g., operations) based on the various embodiments of the present disclosure can be implemented with an instruction stored in a non-transitory computer-readable storage medium (e.g., the memory 130) as a program module. When the instruction is executed by one or more processors (e.g., the processor 120), the one or more processors can perform a function corresponding to the instruction. The non-transitory computer readable recording medium can include, for example, a hard disk, a floppy disc, a magnetic medium (e.g., a magnetic tape), an optical storage medium (e.g., a Compact Disc-ROM (CD-ROM) or a DVD, a magnetic-optic medium (e.g., a floptical disc)), and an internal memory. The instruction can include code created by a compiler or code executable by an interpreter. The module or program module can further include at least one or more components among the aforementioned components, or can omit some of them, or can further include additional other components. Operations performed by a module, program module, or other components of the various embodiments of the present disclosure can be executed in a sequential, parallel, repetitive, or heuristic manner. In addition, some of the operations can be executed in a different order or may be omitted, or other operations may be added.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a plurality of Subscriber Identity Modules (SIMs);
   a short-range communication module electrically coupled with the plurality of SIMs; and
   at least one processor, configured to:
   in response to receiving a SIM change request, transmit a request for coupling release of a coupled first SIM among the plurality of SIMs to the short-range communication module;
   based on releasing the coupling, transmit a request for coupling of a chosen second SIM among the plurality of SIMs to the short-range communication module; and
   based on a coupling notification regarding the second SIM, identify support status of the second SIM, regarding short-range communication function,
   wherein a list of the plurality of SIMs including support status of at least one of the first SIM and the second SIM is displayed.

2. The electronic device of claim 1, wherein the processor is further configured to:
   control the short-range communication module to inactivate a first communication protocol between the first SIM and the short-range communication module in response to the coupling release request, thereby releasing a first communication session between the first SIM and the short-range communication module; and
   control the short-range communication module to activate a second communication protocol between the second SIM and the short-range communication module in response to the coupling request, thereby coupling a second communication session between the second SIM and the short-range communication module.

3. The electronic device of claim 2, wherein the processor is configured to control the short-range communication module to release a logical coupling between the first SIM and the short-range communication module in response to the coupling release request.

4. The electronic device of claim 2, wherein the processor is configured to control the short-range communication module to establish a logical coupling between the second SIM and the short-range communication module in response to the coupling request.

5. The electronic device of claim 2, wherein the first communication protocol is a first Single Wire Protocol (SWP) and the second communication protocol is a second SWP.

6. The electronic device of claim 2, wherein the processor is configured to:
acquire information on the second SIM from the second SIM through the second communication session, using the short-range communication module; and
update a routing table for the plurality of SIMs based on the information on the second SIM.

7. The electronic device of claim 6, wherein the routing table comprises at least one of names corresponding to the plurality of SIMs, phone numbers, pieces of information representing short-range communication availability or non-availability, or information representing coupling or non-coupling with the short-range communication module.

8. The electronic device of claim 2, wherein the processor is configured to:
detect a new SIM is inserted into the electronic device;
in response to detecting the new SIM is inserted, apply a power source to the inserted SIM through the short-range communication module, based on a plurality of reference power source values;
transmit a request for coupling of the inserted SIM to the short-range communication module; and
control the short-range communication module to activate a third communication protocol between the inserted SIM and the short-range communication module, thereby coupling a third communication session between the inserted SIM and the short-range communication module, in response to the coupling request.

9. The electronic device of claim 8, wherein the short-range communication module is configured to establish a logical coupling between the inserted SIM and the short-range communication module in response to the coupling request.

10. The electronic device of claim 1, wherein the processor is configured to:
identify a designated condition is satisfied;
in response to identifying the designated condition is satisfied, display a SIM choosing menu on a screen of the electronic device;
identify whether the second SIM is chosen through the SIM choosing menu; and
in response to identifying the second SIM is chosen, transmit the request for coupling release of the coupled first SIM to the short-range communication module.

11. The electronic device of claim 1, wherein the processor is configured to:
choose the second SIM based on at least one of position information of the electronic device or pieces of billing information corresponding to the plurality of SIMs; and
transmit the request for coupling release of the coupled first SIM to the short-range communication module.

12. A method for operating an electronic device, the method comprising:
in response to receiving a SIM change request, transmitting, by a processor of the electronic device, a request for coupling release of a coupled first Subscriber Identify Module (SIM) among a plurality of SIMs to a short-range communication module;
based on releasing the coupling, transmitting, by the processor, a request for coupling of a chosen second SIM among the plurality of SIMs to the short-range communication module;
identifying, by the processor, whether a coupling notification regarding the second SIM is received from the short-range communication module; and
based on the coupling notification regarding the second SIM, identifying support status of the second SIM, regarding short-range communication function,
wherein a list of the plurality of SIMs including support status of at least one of the first SIM and second SIM is displayed.

13. The method of claim 12, further comprising:
controlling, by the processor, the short-range communication module to inactivate a first communication protocol between the first SIM and the short-range communication module in response to the coupling release request, thereby releasing a first communication session between the first SIM and the short-range communication module; and
controlling, by the processor, the short-range communication module to activate a second communication protocol between the second SIM and the short-range communication module in response to the coupling request, thereby coupling a second communication session between the second SIM and the short-range communication module.

14. The method of claim 13, wherein releasing the first communication session includes releasing a logical coupling between the first SIM and the short-range communication module.

15. The method of claim 13, wherein coupling the second communication session includes establishing a logical coupling between the second SIM and the short-range communication module.

16. The method of claim 13, wherein the first communication protocol is a first Single Wire Protocol (SWP) and the second communication protocol is a second SWP.

17. The method of claim 13, further comprising:
acquiring information on a second SIM from the second SIM through the second communication session; and
updating a routing table for the plurality of SIMs based on the information on the second SIM.

18. The method of claim 17, wherein the routing table comprises at least one of names corresponding to the plurality of SIMs, phone numbers, pieces of information representing short-range communication availability or non-availability, or information representing coupling or non-coupling with the short-range communication module.

19. The method of claim 13, further comprising:
detecting, by the processor, a new SIM is inserted into the electronic device;
in response to detecting the new SIM is inserted, applying, by the processor, a power source to the inserted SIM, based on a plurality of reference power source values;
transmitting, by the processor, a request for coupling of the inserted SIM to the short-range communication module; and
controlling, by the processor, the short-range communication module to activate a third communication protocol between the inserted SIM and the short-range communication module, thereby coupling a third communication session with the inserted SIM.

20. The method of claim 19, wherein coupling the third communication session includes establishing a logical coupling between the inserted SIM and the short-range communication module.

21. The method of claim 12, wherein transmitting the request for coupling release of a coupled first SIM among the plurality of SIMs comprises:
- identifying, by the processor, a designated condition is satisfied;
- in response to identifying the designated condition is satisfied, displaying a SIM choosing menu on a screen of the electronic device;
- identifying, by the processor, whether the second SIM is chosen through the SIM choosing menu; and
- in response to identifying the second SIM is chosen, transmitting, by the processor, the request for coupling release of the coupled first SIM to the short-range communication module.

22. The method of claim 12, wherein transmitting the request for coupling release of a coupled first SIM among the plurality of SIMs comprises:
- choosing, by the processor, the second SIM based on at least one of position information of the electronic device and pieces of billing information corresponding to the plurality of SIMs; and
- transmitting, by the processor, the request for coupling release of the coupled first SIM to the short-range communication module.

\* \* \* \* \*